United States Patent
Khaligh et al.

(10) Patent No.: US 9,878,635 B1
(45) Date of Patent: Jan. 30, 2018

(54) POWERTRAIN SYSTEM IN PLUG-IN ELECTRIC VEHICLES

(71) Applicants: Alireza Khaligh, Arlington, VA (US); Serkan Dusmez, Plano, TX (US)

(72) Inventors: Alireza Khaligh, Arlington, VA (US); Serkan Dusmez, Plano, TX (US)

(73) Assignee: University of Maryland, College Park, MD (US)

(*) Notice: Subject to any disclaimer, the term of this patent is extended or adjusted under 35 U.S.C. 154(b) by 0 days.

(21) Appl. No.: 14/618,696

(22) Filed: Feb. 10, 2015

Related U.S. Application Data

(63) Continuation-in-part of application No. 14/179,108, filed on Feb. 12, 2014, now Pat. No. 9,419,522.

(60) Provisional application No. 61/764,325, filed on Feb. 13, 2013.

(51) Int. Cl.
*B60K 1/02* (2006.01)
*B60L 11/18* (2006.01)
*B60L 3/12* (2006.01)

(52) U.S. Cl.
CPC ............ *B60L 11/1868* (2013.01); *B60L 3/12* (2013.01); *B60L 11/1803* (2013.01); *Y10S 903/904* (2013.01)

(58) Field of Classification Search
CPC .............................. B60W 10/26; H02M 3/156
See application file for complete search history.

(56) References Cited

U.S. PATENT DOCUMENTS

| | | | | |
|---|---|---|---|---|
| 5,592,371 A | * | 1/1997 | Rajashekara | H02M 7/4826 363/132 |
| 5,594,634 A | * | 1/1997 | Rajashekara | H02M 5/4585 363/132 |
| 5,710,699 A | * | 1/1998 | King | B60L 11/005 318/139 |
| 5,717,584 A | * | 2/1998 | Rajashekara | H02M 7/5387 363/132 |
| 8,570,005 B2 | * | 10/2013 | Lubomirsky | H02J 3/383 323/259 |
| 8,988,838 B2 | * | 3/2015 | Har-Shai | H02H 1/0015 320/101 |
| 9,327,591 B2 | * | 5/2016 | Yamamoto | B60K 6/445 |

(Continued)

*Primary Examiner* — Jeffrey J Restifo
(74) *Attorney, Agent, or Firm* — Rosenberg, Klein & Lee

(57) ABSTRACT

A powertrain system for plug-in electric vehicles (PEVs) includes one or a number of Energy Storage Sub-Systems (ESSs), and a plurality of Propulsion Machine-Inverter Groups, operatively coupled to the ESSs for being powered in accordance with power requirements of the Propulsion Machines (PMs). Various interface configurations between the ESS(s) and Propulsion Machines are contemplated for the subject powertrain. Some ESSs are coupled to respective PMs (via a common DC Link or a number of independent DC Links) directly, and some through power converters, which may be DC-to-DC, DC-to-AC, AC-to-DC, bi-directional, single input-single output, multiple input-single output, or multiple input-multiple output converters. A Supervisory Energy Management Sub-System cooperates with a Maximum Efficiency Tracker to dynamically control energy distribution in the system based on power requirements of the PMs through control of Propulsion Inverters and/or power converters to dynamically adjust the power level output by the ESSs to the DC Links' voltage variations.

24 Claims, 25 Drawing Sheets

(56) References Cited

U.S. PATENT DOCUMENTS

| | | | |
|---|---|---|---|
| 9,374,001 B1* | 6/2016 | Subramaniam | H02M 3/04 |
| 9,399,407 B2* | 7/2016 | Zhou | B60L 11/005 |
| 2007/0230228 A1* | 10/2007 | Mao | H02M 3/156 |
| | | | 363/89 |
| 2009/0160259 A1* | 6/2009 | Naiknaware | H02M 7/4807 |
| | | | 307/82 |
| 2009/0237042 A1* | 9/2009 | Glovinski | H02M 1/34 |
| | | | 323/235 |
| 2010/0096926 A1* | 4/2010 | King | B60L 11/123 |
| | | | 307/45 |
| 2010/0097031 A1* | 4/2010 | King | B60L 11/1803 |
| | | | 320/109 |
| 2010/0148739 A1* | 6/2010 | Khaligh | H02M 3/1582 |
| | | | 323/283 |
| 2012/0007551 A1* | 1/2012 | Song | B60L 11/1814 |
| | | | 320/109 |
| 2012/0112702 A1* | 5/2012 | Steigerwald | B60L 3/0069 |
| | | | 320/137 |
| 2014/0265945 A1* | 9/2014 | Deboy | B60L 11/1851 |
| | | | 318/139 |
| 2015/0078049 A1* | 3/2015 | Yoo | H02M 7/53871 |
| | | | 363/123 |
| 2015/0303815 A1* | 10/2015 | Chen | H02M 3/158 |
| | | | 363/21.04 |
| 2015/0303827 A1* | 10/2015 | Lee | H02M 7/537 |
| | | | 363/97 |
| 2016/0036323 A1* | 2/2016 | She | H02M 3/156 |
| | | | 307/29 |
| 2016/0052410 A1* | 2/2016 | Zhou | B60L 11/1811 |
| | | | 320/109 |
| 2016/0052417 A1* | 2/2016 | Zhou | B60L 11/005 |
| | | | 701/22 |
| 2016/0052423 A1* | 2/2016 | Zhou | B60L 15/06 |
| | | | 701/22 |
| 2016/0211774 A1* | 7/2016 | Degner | H02M 7/53875 |
| 2016/0236579 A1* | 8/2016 | Yim | B60L 11/1805 |
| 2016/0294304 A1* | 10/2016 | Li | B60L 11/005 |
| 2016/0329811 A1* | 11/2016 | Du | H02M 3/1584 |
| 2017/0036555 A1* | 2/2017 | Albanna | B60L 11/1812 |
| 2017/0057363 A1* | 3/2017 | Huh | B60L 11/18 |
| 2017/0063270 A1* | 3/2017 | Normann | H02J 3/00 |
| 2017/0072811 A1* | 3/2017 | Tabatowski-Bush | B60L 11/1864 |

* cited by examiner

POWERTRAIN SYSTEM IN PLUG-IN ELECTRIC VEHICLES

REFERENCE TO RELATED APPLICATIONS

This Utility Patent Application is based on a Provisional Patent Application No. 61/938,578, filed 11 Feb. 2014, and is a Continuation-in-Part (CIP) to the patent application Ser. No. 14/179,108, filed on 12 Feb. 2014.

FIELD OF THE INVENTION

The present invention is directed to a powertrain of electric vehicles; and more in particular, to numerous configurations of the Energy Storage System (or Sub-System) and the Propulsion Machines interfacing with electric vehicles and plug-in hybrid electric vehicles, cumulatively referred to as plug-in electric vehicles (PEVs).

In overall concept, the present invention directs itself to a power train system for plug-in electric vehicles which includes a single (or a number of) Energy Storage Sub-System(s), and a plurality of Propulsion Machine-Inverter Groups operatively coupled to the Energy Storage Sub-System(s) for being powered therefrom in accordance with operational power requirements of the Propulsion Machines in the plug-in electric vehicles in question.

The present invention also is directed to a powertrain system for plug-in electric vehicles which uses a power converter operatively coupled between the Energy Storage Sub-System(s) and the Propulsion Machine-Inverter Groups in a specific configuration of the power electronic interfaces between the Energy Storage Sub-System(s) and the Propulsion Machines. The possible configurations of the electronic interface may include: a single Energy Storage Sub-System (ESS) directly connected to a number of Inverters and Propulsion Machines; a single ESS connected to a number of Inverters/Propulsion Machines through a single-input single-output converter; a number of Energy Storage Sub-Systems connected to a number of Propulsion Machines through a single-input, single-output converter; a number of Energy Storage Sub-Systems connected to a plurality of Inverters/Propulsion Machines through a number of single-input, single-output converters; a plurality of Energy Storage Sub-Systems connected to Inverters/Propulsion Machines through a multiple-input, single-output converter; Energy Storage Sub-Systems connected to Inverters/Propulsion Machines with one direct connection and the remaining connections through a multi-input single-output converter; Energy Storage Sub-Systems connected to Inverters/Propulsion Machines through a multi-input and multi-output converter; Energy Storage Sub-Systems connected to Inverters/Propulsion Machines through individual single-input, single-output converters; Energy Storage Sub-Systems connected to Inverters/Propulsion Machines with a portion of ESSs coupled directly and the rest of the ESSs connected through individual single-input, single-output converters; Energy Storage Sub-Systems connected directly to Inverters/Propulsion Machines, with additional converters between all or some of the Energy Storage Sub-Systems (also intermittently referred to herein as Energy Storage Sources); Energy Storage Sub-Systems connected through a number of DC-to-DC converters to Inverters/Propulsion Machines and additional converters between all or some of the ESSs; Energy Storage Sub-Systems connected to respective Propulsion Machines through individual DC-to-DC converters, and with some of the ESSs directly connected to the rest of Inverters/Propulsion Machines, with additional converter coupled between respective ESSs; Energy Storage Sub-Systems connected to Inverters/Propulsion Machines through an MISO (Multiple Input-Single Output) DC-to-DC converter, with additional converters positioned between the ESSs; Energy Storage Sub-Systems connected to Inverters/Propulsion Machines with one ESS coupled directly and the remaining ESSs connected through an MISO DC-to-DC converter, with additional converters coupled between respective ESSs; Energy Storage Sub-Systems connected to Propulsion Machines through an MIMO DC-to-DC converter, with additional converters between all or some of the ESSs; Energy Storage Sub-Systems connected to Inverters/Propulsion Machines, with some ESSs connected directly to the respective Inverters/Propulsion Machines, and the remaining ESSs connected through an MIMO DC-to-DC converter, with additional converters between all or some of the ESSs.

The present invention further is directed to a plug-in electric vehicle capable of using DC-to-DC converters, or AC-to-DC converters, or DC-to-AC bi-directional converters in the connection link between the Energy Storage Sub-Systems and the Propulsion Machines.

The present invention additionally is directed to the powertrain system for plug-in electric vehicles employing a Maximum Efficiency Tracker Sub-System to dynamically track operational power requirements of the Propulsion Machines. An Inverter Controller Sub-System is operatively coupled to the Maximum Efficiency Tracker Sub-System for controlling the Propulsion Inverters in the Propulsion Machine-Inverter Groups in accordance with the readings acquired from the Maximum Efficiency Tracker Sub-System to dynamically split power output from the energy storage sub-systems in correspondence with the Propulsion Machine's operational power requirements.

The present invention additionally relates to a powertrain system for plug-in electric vehicles employing a Supervisory Energy Management Sub-System operatively coupled to the Maximum Efficiency Tracker Sub-System, and a Sub-System of Controllers for the power converters. The Supervisory Energy Management Sub-System is configured to supply corresponding signals (reflecting a required power) to the power converters' Controllers responsive to the readings of the Maximum Efficiency Tracker Sub-System to affect the splitting of the power among the Energy Storage Sub-Systems as required by the operational power requirements of the Propulsion Machines.

The present invention is further directed to a plug-in electric vehicle using DC-to-DC (or DC-to-AC, or AC-to-DC) converters serving as an interface between the Energy Storage Sub-System(s) and the DC drive link, where the DC-to-DC converters have a high efficiency due to zero-voltage switching in both power flow directions, and negligent inductor ripples, and which provides an enhanced flexibility attained by operating with three level voltage in both power flow directions.

BACKGROUND OF THE INVENTION

The term powertrain, or powerplant, describes the main components that generate power and deliver power to the road surface, water, or air. In a wider sense, the powertrain includes components used to transform a stored (chemical, solar, nuclear, kinetic, potential, etc.) energy into kinetic energy for propulsion purposes.

The powertrain of the current and upcoming electric vehicles (EVs) and plug-in hybrid electric vehicles (PHEVs), cumulatively called plug-in electric vehicles (PEVs), is composed of a high-power battery pack, as the Energy Storage Sub-System (ESS), and an Inverter followed by a Propulsion Machine for electric propulsion.

Electric vehicles are vehicles propelled by electricity as opposed to the conventional vehicles which operate by liquid or gaseous fuels. Electric vehicles may use a combination of different energy sources such as, for example, fuel cells (FCs), batteries, and super-capacitors (or ultra-capacitors) to power an electric drive system as shown in FIG. 1. Electric vehicles (EVs) operate with high energy conversion efficiency, produce a lower level of exhaust emissions, and lower level of acoustic noise and vibration than conventional vehicles. The electricity needed for electric vehicles' operation may be produced either external the vehicle and stored in the battery, or produced onboard with the help of fuel cells.

A plug-in electric vehicle (PEV) is any motor vehicle that can be recharged from an external source of electricity, such as wall sockets. The electricity stored in the rechargeable battery packs drives or contributes to drive the wheels. PEV is a superset of electric vehicles that includes all-electric or battery electric vehicles (BEVs), plug-in hybrid vehicles (PHEVs), and electric vehicle conversions of hybrid electric vehicles as well as conventional internal combustion engine vehicles.

In electric vehicles, the main energy source is assisted by one or more energy storage devices. A combination of batteries and super-capacitors are often used as Energy Storage Sources which can be connected to the fuel cell stack in a number of ways. The voltage characteristics of the two devices must match perfectly, and only a fraction of the range of operation of the Energy Storage devices can be utilized. For example, in a fuel cell/battery configuration, the fuel cell must provide substantially constant power all the time due to the fixed voltage of the battery, and in a battery/super-capacitor configuration, only a fraction of the energy exchange capability of the super-capacitor (also referred to herein as ultra-capacitor) can be used.

DC-to-DC converters can be used to interface the elements in the electric powertrain by boosting or chopping the voltage levels as required by the load in different regimes of the EV operations. By introducing the DC-to-DC converters, one can select the voltage variations of the devices, and the power of each device can be controlled.

Different configurations of EV power supplies dictates that at least one DC-to-DC converter is necessary to interface the fuel cell, the battery, or the super-capacitor's module and the DC Link. The DC-to-DC converter structure has to be reliable and lightweight, small in volume, operate with high efficiency, and low electromagnetic interference, and low current/voltage ripple.

A DC-to-DC converter is a category of power converters having an electric circuit which converts a source of direct current (DC) from one voltage level to another, by storing the input energy temporary and subsequently releasing the energy to the output at a different voltage level.

The storage of the input energy may be in either magnetic field storage components (inductors, transformers) or electric field storage components (capacitors). DC-to-DC converters can be designed to transfer power in only one direction, from the input to the output. However many all DC-to-DC converter topologies can be made bi-directional which can move power in either direction which is useful in applications requiring regenerative braking.

The amount of power flow between the input and the output of the DC-to-DC converter can be controlled by adjusting the duty cycle (which is identified as a ratio of on/off time of a switch in the DC-to-DC converter). Usually, this is done to control the output voltage, the input current, the output current, or to maintain a constant power.

It is desirable to use DC-to-DC converters with minimized switching losses, lower inductor current ripple and low switch voltage ratings, as well as reduced output voltage ripples, and enhanced reliability and autonomy of the operation in plug-in electric vehicles.

It is also desirable to provide various configurations of power electronic interfaces between the Energy Storage Sub-Systems and the Propulsion Machines (including electric traction system), in the plug-in electric vehicles, with efficient dynamic splitting of power output from the Energy Storage Sub-Systems to power the Propulsion Machines in accordance with their operational power requirements in a dynamic fashion in order to attain an extended ESS usability and lifetime and to provide the power flow control flexibility.

SUMMARY OF THE INVENTION

It is therefore an object of the present invention to provide a powertrain system for plug-in electric vehicles where the configuration of the interfacing between the Energy Storage Sub-System and the Inverters/Propulsion Machines permits the extended usability and lifetime for the Energy Storage Sub-System and an increased flexibility of the power flow control between the Energy Storage Sub-Systems and the Propulsion Machines, as well as control of the power flow between the Energy Storage Sub-Systems.

It is another object of the present invention to provide a powertrain system in plug-in electric vehicles where multiple Inverters/Propulsion Machines are powered by the power output from the Energy Storage Sub-System(s) in an efficient and dynamically adjustable manner for power flow control and where power converter(s) is (are) operatively introduced in the link between the Energy Storage Sub-System(s) and the Inverters/Propulsion Machines, and where the power converter has a topology supporting high efficiency of the powertrain system.

It is also an object of the present invention to provide a powertrain system in plug-in electric vehicles which may employ various power converters (DC-to-DC converters, or AC-to-DC, as well as DC-to-AC bi-directional converters) in the interface link between the Energy Storage Sub-Systems and the Propulsion Machines.

The present invention is directed to a powertrain system in plug-in electric vehicles which includes at least one Energy Storage Sub-System (ESS), and a plurality of Propulsion Machine-Inverter Groups, each composed of a Propulsion Machine and a Propulsion Inverter coupled to an input of the Propulsion Machine. The plurality of Propulsion Machine-Inverter Groups are operatively coupled to the ESS for being powered in accordance with operational power requirements of the Propulsion Machines.

At least one Direct Current (DC) Link is operatively coupled between the ESS and at least one of the plurality of Propulsion Machine-Inverter Groups. In one embodiment, the DC Link is a common DC Link, to which the plurality of the Propulsion Machine-Inverter Groups are coupled.

Preferably, a Maximum Efficiency Tracker Sub-System is operatively coupled to the Propulsion Machine in at least one of the plurality of Propulsion Machine-Inverter Groups to dynamically track the operational power requirements of the Propulsion Machine. An Inverter Controller Sub-System is operatively coupled to the Maximum Efficiency Tracker Sub-System and the Propulsion Inverter in the Propulsion Machine-Inverter Group. The Inverter Controller Sub-system is configured to control the Propulsion Inverter to split the power output from the ESS in correspondence with the Propulsion Machine's operational power requirements.

The powertrain further may employ at least one power converter operatively coupled between the ESS and the common DC Link. The power converter operates to dynamically adjust the level of the power output by the ESS to the common DC Link's voltage variations.

The subject powertrain system may be provided with a plurality of ESSs composed of a first group of ESSs and a second group of ESSs, and a plurality of power converters operatively coupled between the second group of ESSs and common DC Link. At least one ESS in the first group is directly coupled to the common DC Link, while each ESS in the second group is coupled to the common DC Link through a respective power converter.

The powertrain system employs a plurality of power converters' controllers, and a Supervisory Energy Management Sub-System coupled to the power converters' controllers and the Maximum Efficiency Tracker Sub-System. The Supervisory Energy Management Sub-System is configured to supply signals corresponding to a required power to the power converters' controllers responsive to the readings of the Maximum Efficiency Tracker Sub-System, thus affecting the splitting of power among the plurality of ESSs as required by the operational power requirements of the Propulsion Machines.

In one of the numerous configurations, the powertrain system comprises a plurality of ESSs, and a plurality of power converters. In this configuration, each ESS is operatively coupled to the common DC Link through a respective power converter. The power converter may be a single input-single output converter.

The subject powertrain system may use a multi-input single-output power converter to be coupled between some of the ESSs and the common DC Link, while the remaining ESSs are directly coupled to the common DC Link.

Alternatively, the subject powertrain system may include a plurality of DC Links. In this configuration, each Propulsion Machine-Inverter Group may be coupled to a respective one of a plurality of outputs of the multi-input, multi-output power converter through a respective one of the plurality of DC links, while each of the plurality of ESSs is coupled to a respective input of the multi input-multi output power converter.

In an additional configuration of the subject powertrain system, the power converter may be coupled to a respective one of the ESSs, and each of the plurality of Propulsion Machines-Inverter Groups may be coupled to a respective one of the plurality of power converters through a corresponding one of the plurality of DC Links.

Alternatively, at least one ESS may be coupled to a respective Propulsion Machine-Inverter Group through a respective one of the plurality of DC Links, and each of the remaining ESSs may be coupled to a respective Propulsion Machine-Inverter Group through a corresponding single input-single output power converter. Each of the plurality of single input-single output power converters may be coupled between a respective ESS and a corresponding one of the plurality of DC Links.

Power converters may also be coupled between respective ESSs.

Any power converter may be used in the subject powertrain system. In one of the alternative embodiments, the power converter may be a DC-to-DC converter, which may include:

main switches $S_1$, $S_2$, $S_3$, and $S_4$ coupled sequentially between opposite first and second terminals of the ESS, wherein the main switches $S_2$ and $S_3$ are coupled each to the other, a first zero-voltage switching (ZVS) circuit coupled to the first terminal of the ESS between the main switches $S_1$ and $S_2$ and functioning to substantially eliminate switching losses in main switches $S_1$ and $S_2$, thereby attaining an increased switching frequency for the main switches $S_1$ and $S_2$.

Further, a second zero-voltage-switching (ZVS) circuit may be coupled to the second terminal of the ESS between the main switches $S_3$ and $S_4$, and function to substantially eliminate switching losses in main switches $S_3$ and $S_4$, thereby attaining an increased switching frequency for the main switches $S_3$ and $S_4$ wherein each main switch $S_1$-$S_4$ includes a solid state switch.

A transfer inductor may be coupled between the first terminal of the ESS and the first ZVS circuit.

The DC-to-DC converter further may include an ultra-capacitor bank split in two bank capacitors $UC_1$ and $UC_2$ functioning as the DC links capacitors. The bank capacitor $UC_1$ is connected between the main switch $S_1$ and a connection node of the main switches $S_2$ and $S_3$. The bank capacitor $UC_2$ is connected between the main switch $S_4$ and the connection node of the main switches $S_2$ and $S_3$.

The converter controller supplies control signals $V_{tri1}$ to the main switches $S_1$ and $S_2$, and $V_{tri2}$ to the main switches $S_3$ and $S_4$ to control switching of respective ones of the main switches $S_1$-$S_4$ in a predetermined order depending on a required mode of operation to attain efficient three level DC-to-DC voltage conversion with decreased switching losses and reduced current ripple on the transfer inductor.

The DC-to-DC converter may operate bi-directionally in:
(a) a boost mode, where the power flow is directed from the ESS to the DC Link, and
(b) a buck mode, where the energy flow is directed form the DC Link to the ESS, In the boost mode of operation, the main switches $S_2$ and $S_3$ are pulse-width-modulated, and the main switches $S_1$ and $S_4$ are switched OFF.

In the buck mode of operation, the main switches $S_1$ and $S_4$ are pulse-width modulated, and the main switches $S_2$ and $S_3$ are switched OFF.

Preferably, the control signals $V_{tri1}$ and $V_{tri2}$ have 180° phase shift with respect each to the other.

A switching frequency of a corresponding one of the main switches $S_1$, $S_2$, $S_3$, and $S_4$ is controlled in accordance with a period of a respective one of the control signals $V_{tri1}$ and $V_{tri2}$,
wherein the corresponding main signal is turned ON when a value of a duty cycle of the corresponding main switch exceeds an amplitude of the respective control signal, and the turn-on time of the corresponding main switch is phase-shifted, resulting in an effective frequency of said DC-to-DC converter twice as high as the switching frequency.

These and other objects and advantages of the present invention will be apparent from the description of the preferred embodiments taken in conjunction with the Patent Drawings.

DETAILED DESCRIPTION OF THE PREFERRED EMBODIMENT

The Powertrain 10 for plug-in electric vehicles (PEVs) includes either a single high-power battery pack as the Energy Storage Sub-System (ESS) 12, or a number of ESSs, and a number of Propulsion Machine-Inverter Groups 14. Each Propulsion Machine-Inverter Group 14 is built with a Propulsion Inverter 16 followed by a Propulsion Machine 18 for electric propulsion of the electric vehicle.

The electric propulsion is attained through i (i=1-n) Propulsion Machines 18, which may include various propulsion machines, such as, for example, induction machines, permanent magnet machines, synchronous machines, switched reluctance machines, or other potential electric machine.

The function of the propulsion inverters is to drive the propulsion machines according to the speed command received from the driver. Required torque reference is generated from the error between the speed command and the actual speed. Overall torque demand and speed references are supplied as inputs to a Maximum Efficiency Controller (detailed further herein), which generates the torque references for individual propulsion machines based on their maximum efficiency operation points. The control of the inverters may include, but not limited to, field-oriented control, direct torque control, V/f scalar control, etc., depending on the utilized electric machine type.

The Energy Storage Sub-System 12 may be composed of i (i=1–k) energy sources. The energy sources may include energy storage source including, but not limited to, high-power (HP) batteries, high energy (HE) batteries, hybrid HP/HE batteries, high-power super-capacitors, ultrahigh-power electrostatic super-capacitors, electrochemical nanostructure ultra high-power super-capacitors, hybrid super-capacitors, flywheels, and other kinds of fuel cells.

Figure 1:
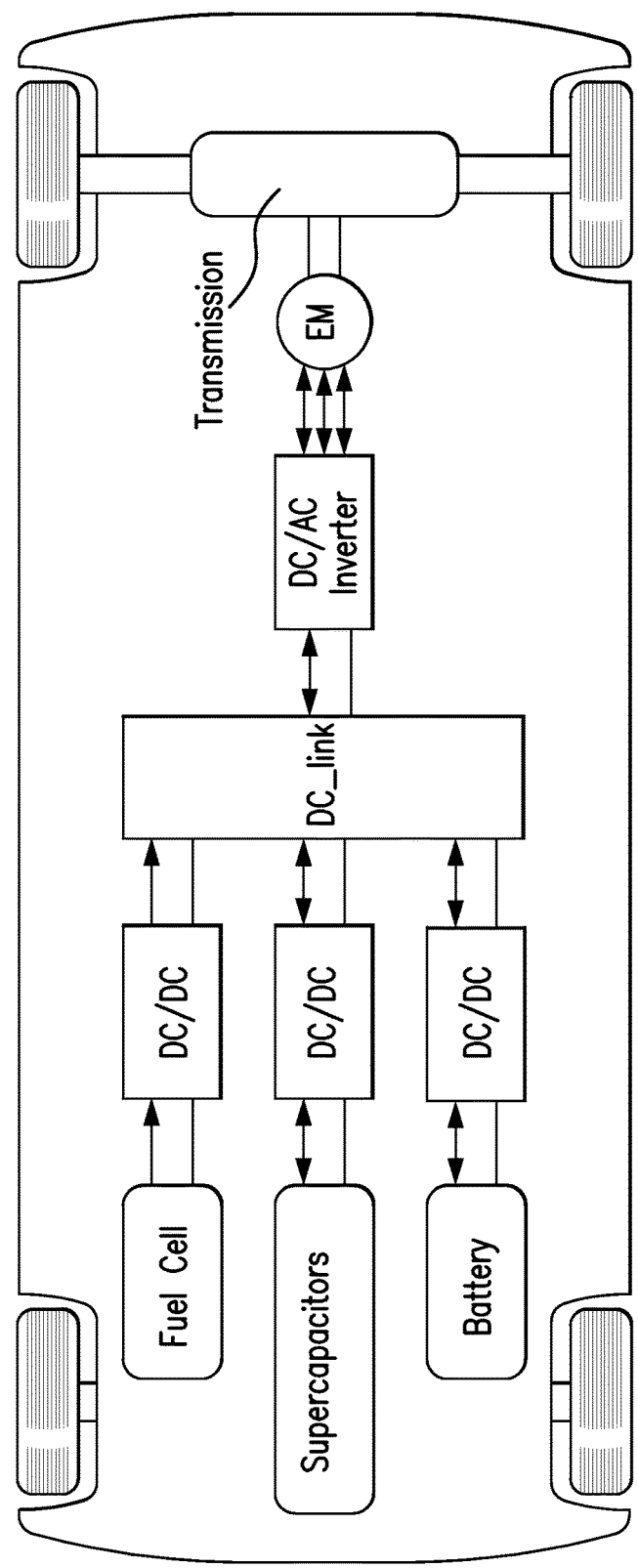
FIG. 1 is a schematic representation of the electric vehicle drive system of the prior art.
Figure 2:
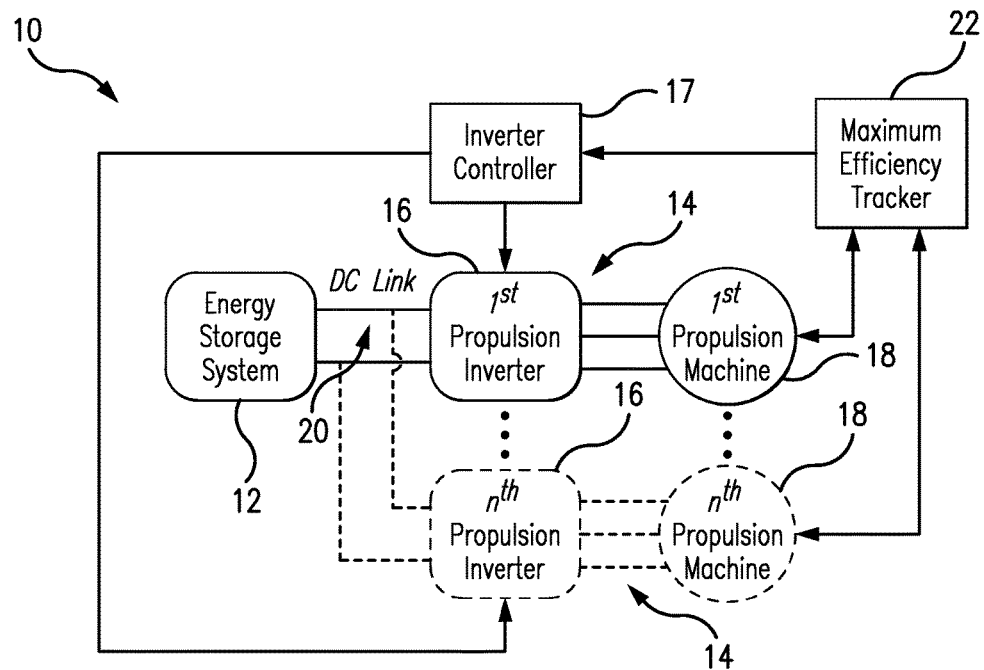
FIG. 2 is a schematic representation of the subject powertrain system with a single ESS directly connected to N propulsion machines.
Figure 3:
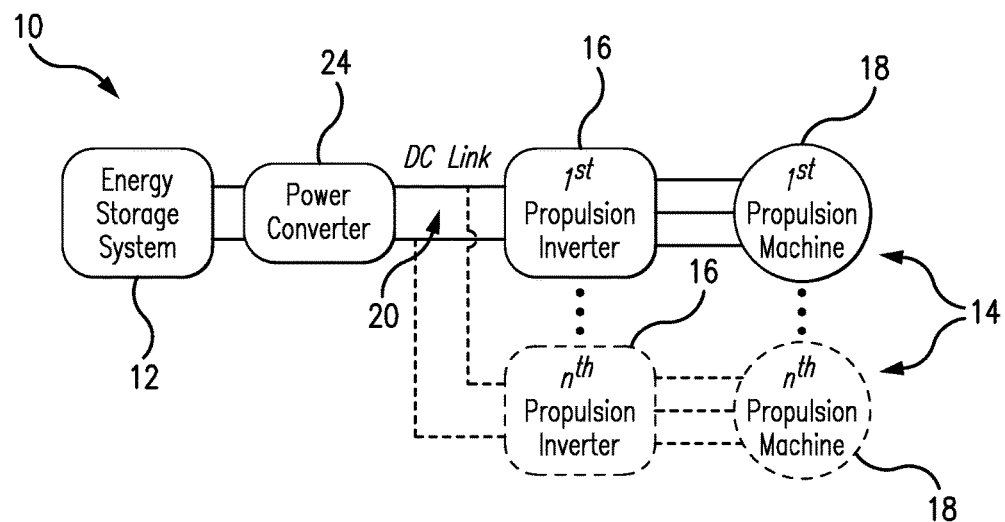
FIG. 3 is a schematic representation of the subject powertrain system with the single ESS connected to N Propulsion Machines through a single input-single output converter.
Figure 4:
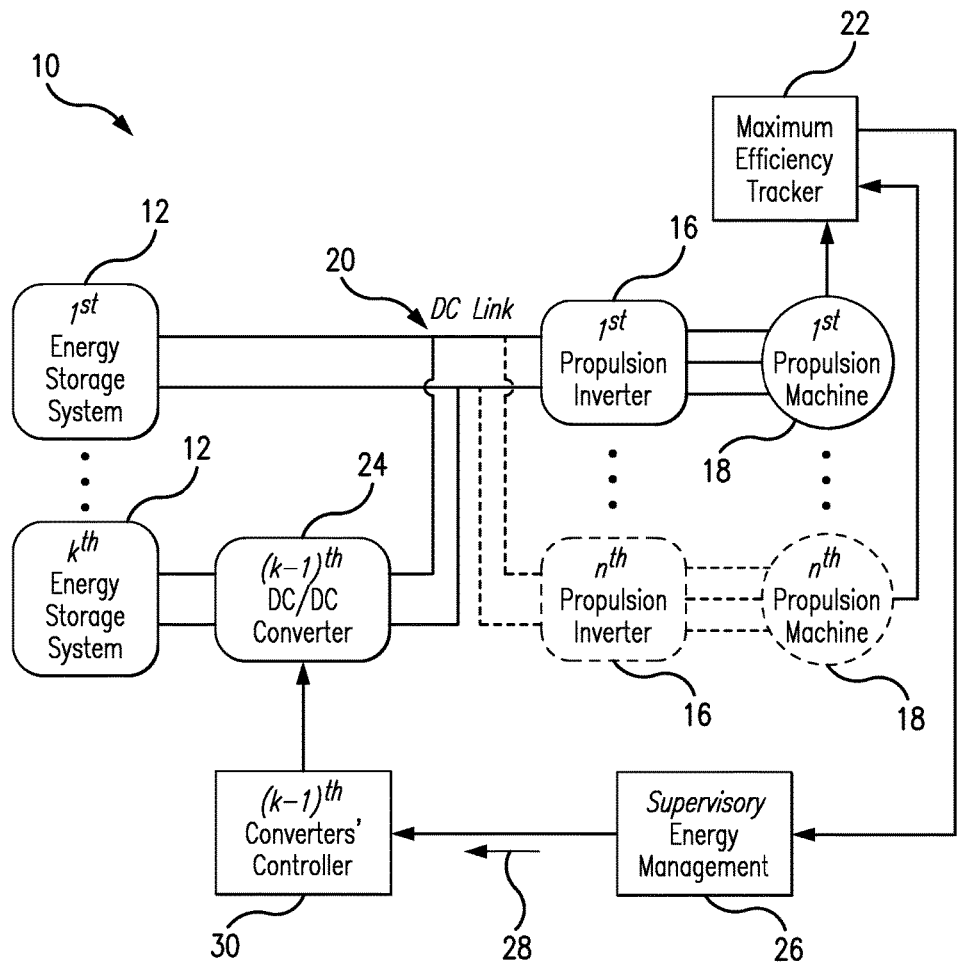
FIG. 4 is a schematic representation of the powertrain system where K Energy Storage Sub-Systems are directly connected to the DC Link and are connected to N Propulsion Machines through a single input-single output converter.
Figure 5:
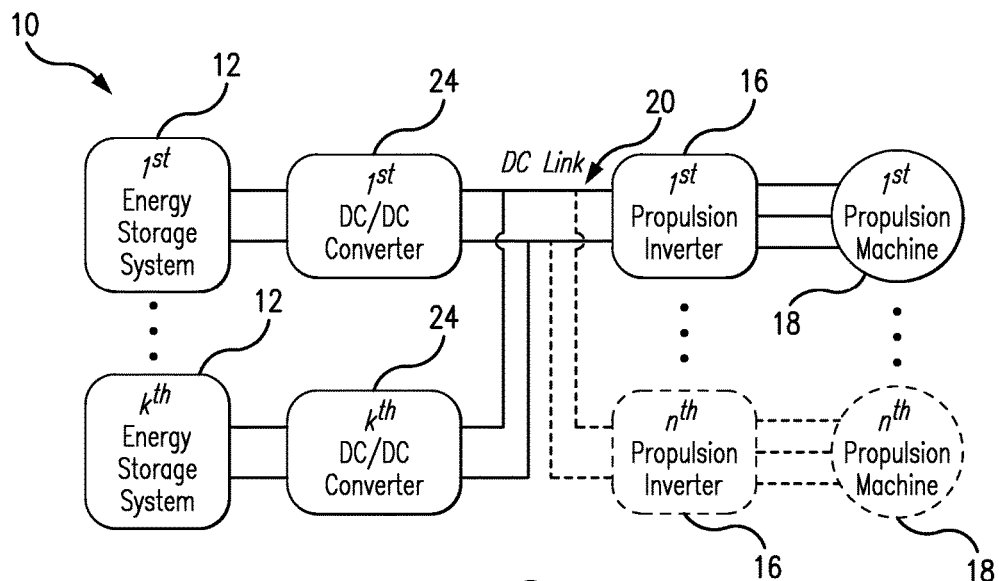
FIG. 5 is representative of the subject powertrain system with K Energy Storage Sub-Systems connected to N Propulsion Machines through K single input-single output converters.
Figure 6:
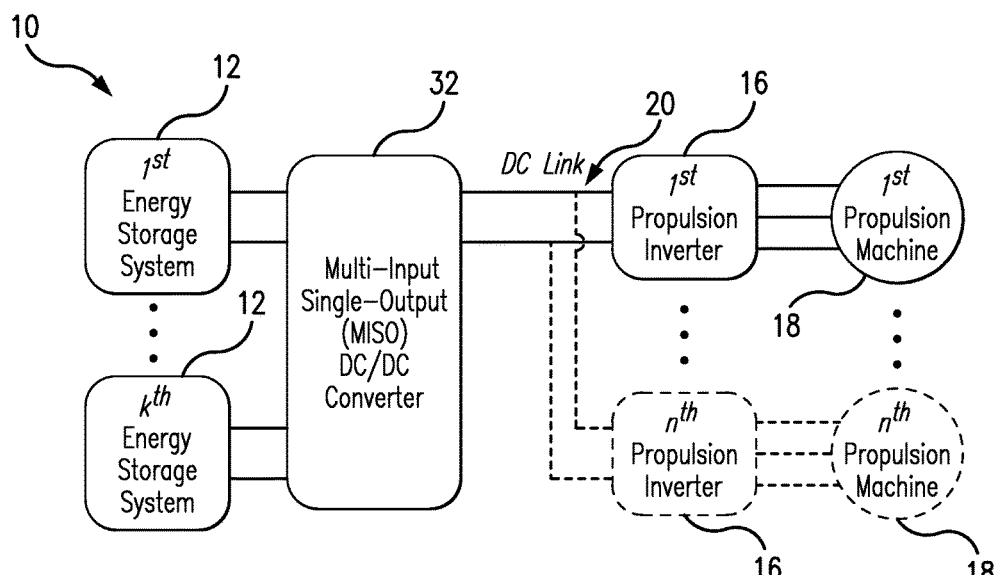
FIG. 6 is a schematic representation of the subject powertrain system where K Energy Storage Sub-Systems are connected to N Propulsion Machines through a multiple input (K-input)-single output converter.
Figure 7:
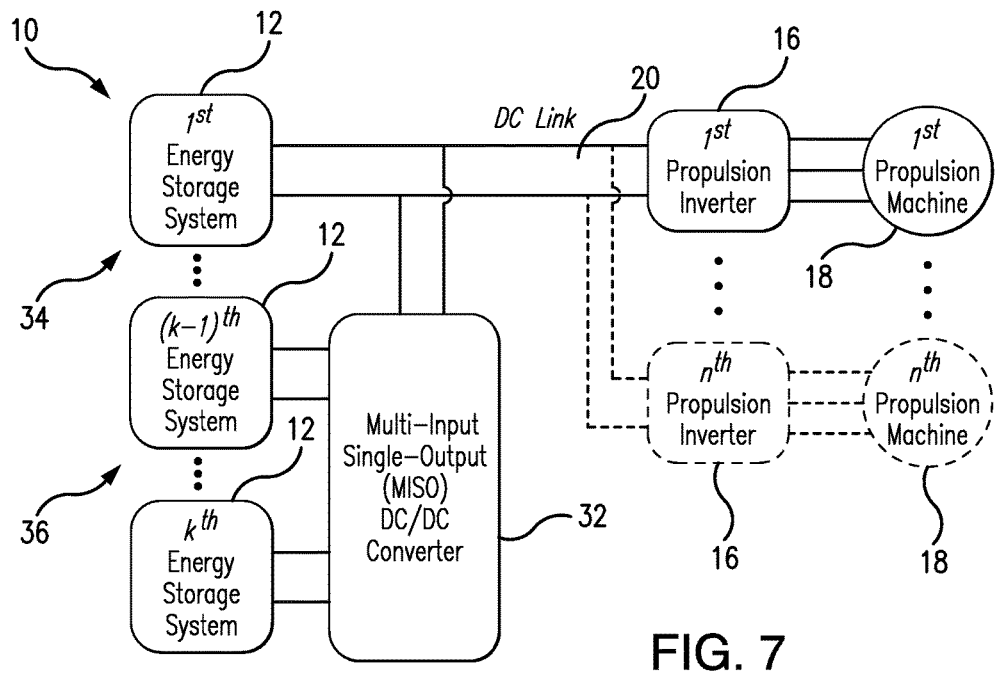
FIG. 7 is a schematic representation of the subject power system where K Energy Storage Sub-Systems are connected to N Propulsion Machines, with one direct connection and the rest of the Energy Storage Sub-Systems through a multiple input (j-input, j<K)-single output converter.
Figure 8:
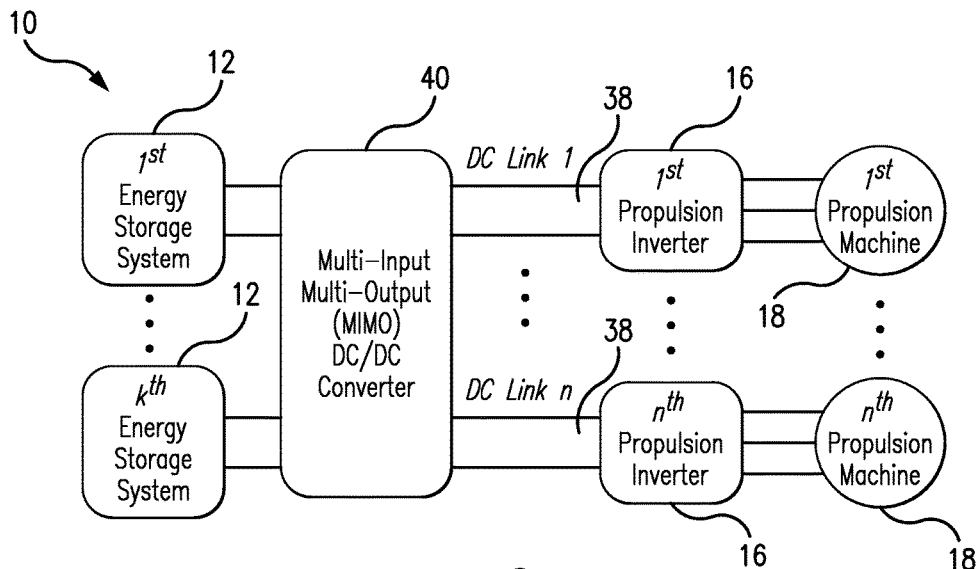
FIG. 8 is a schematic representation of the subject powertrain system where K Energy Storage Sub-Systems are connected through independent DC Links to N Propulsion Machines via a multiple input-multiple output converter.
Figure 9:
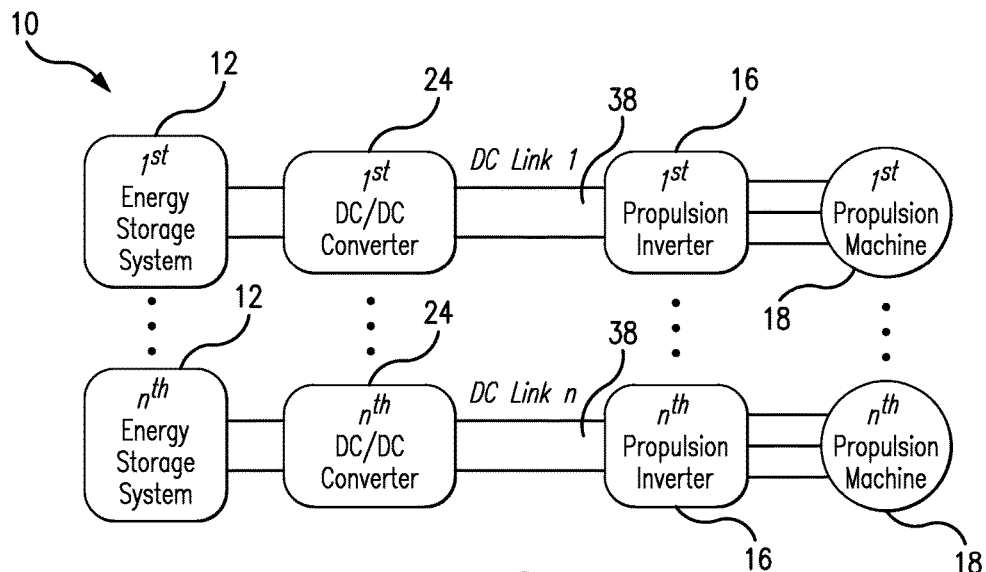
FIG. 9 is a schematic representation of the subject powertrain system where K Energy Storage Sub-Systems are connected through independent DC Links to N Propulsion Machines via N individual single input-single output converters.
Figure 10:
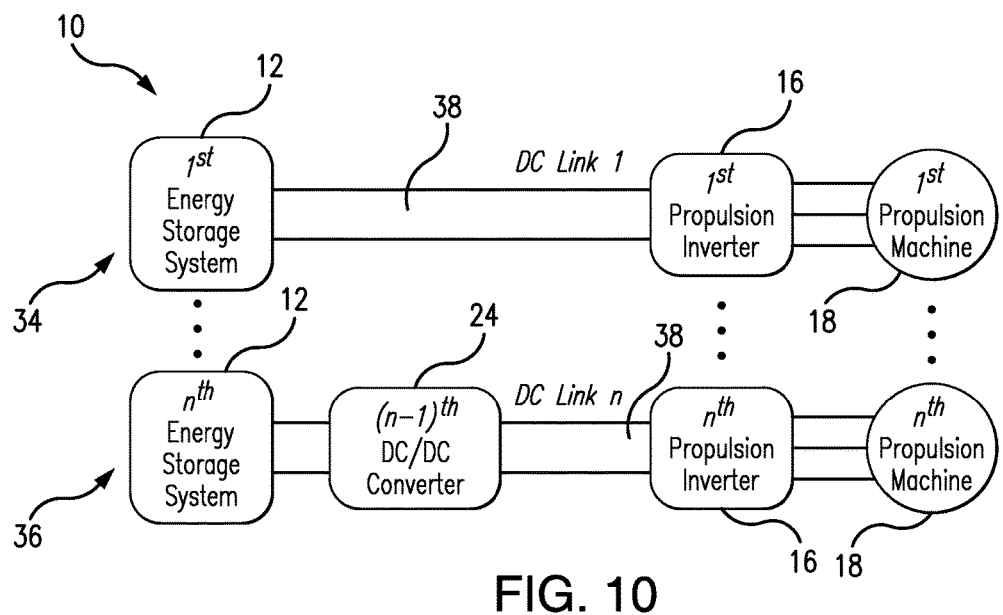
FIG. 10 is a schematic representation of the subject powertrain system where K Energy Storage Sub-Systems are connected through independent DC Links to N Propulsion Machines, some directly and others through j (j<N) individual single input-single output converters.
Figure 11:
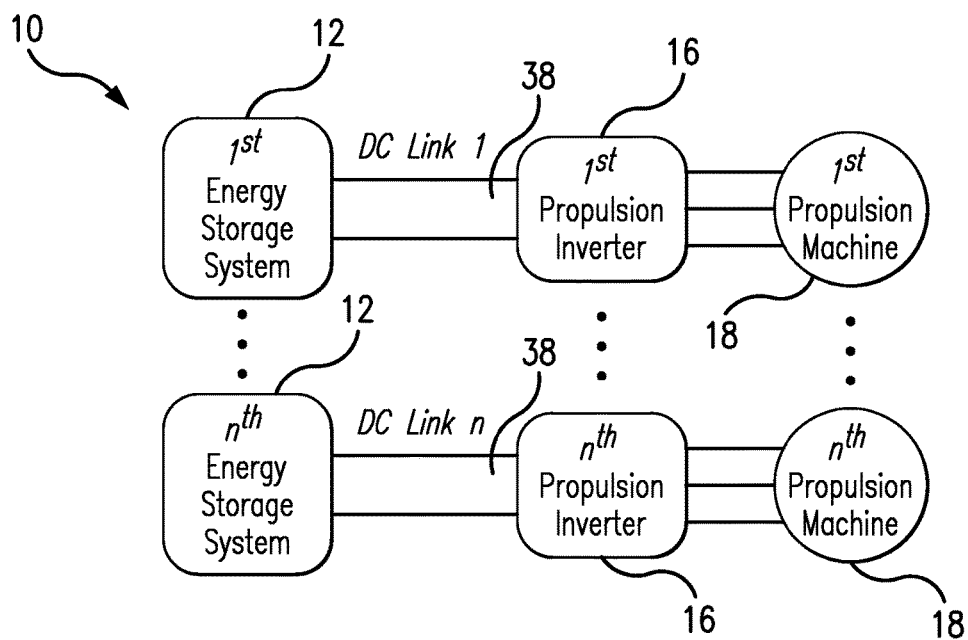
FIG. 11 is a schematic representation of the subject powertrain system where K Energy Storage Sub-Systems are connected directly to N Propulsion Machines through independent DC Links.
Figure 12:
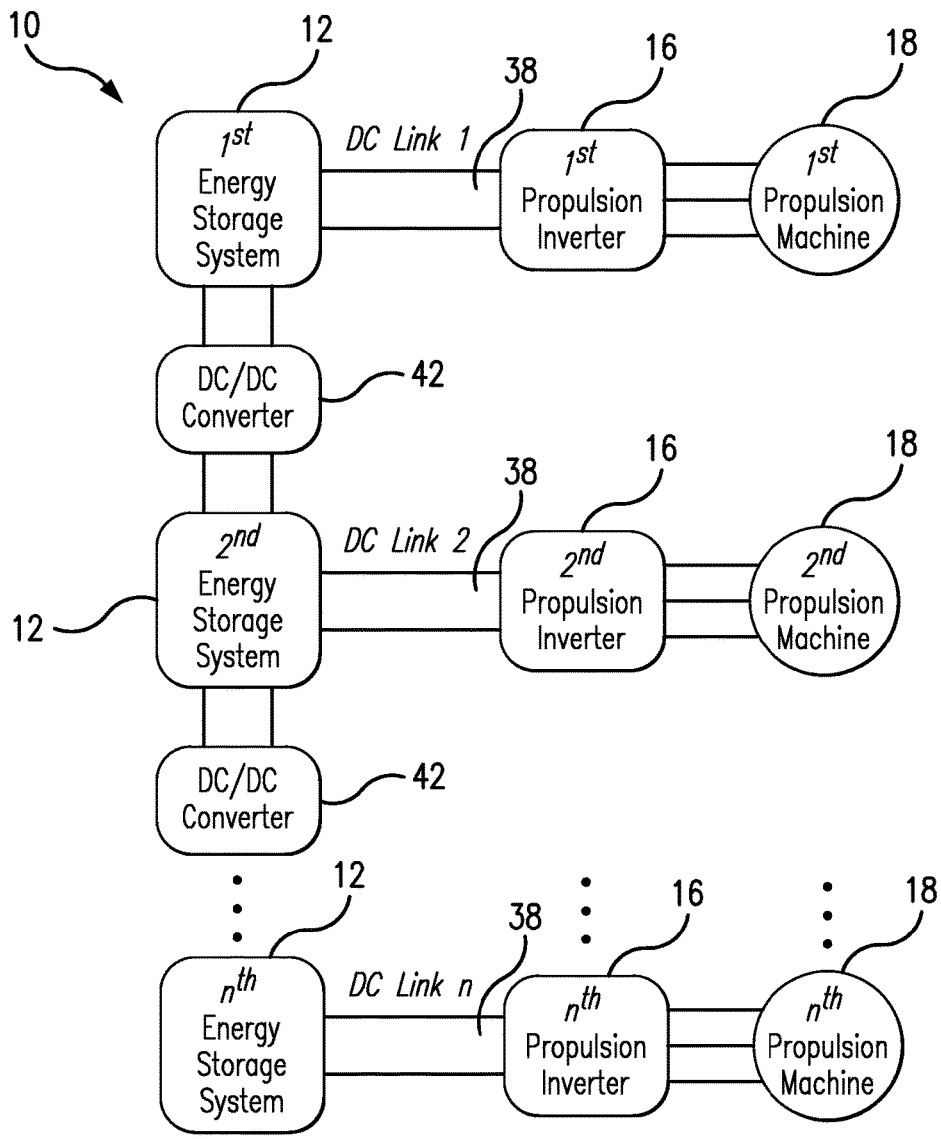
FIG. 12 is a schematic representation of the subject powertrain system where K Energy Storage Sub-Systems are connected directly to N Propulsion Machines through independent DC Links with additional converters coupled between respective Energy Storage Sub-Systems.
Figure 13:
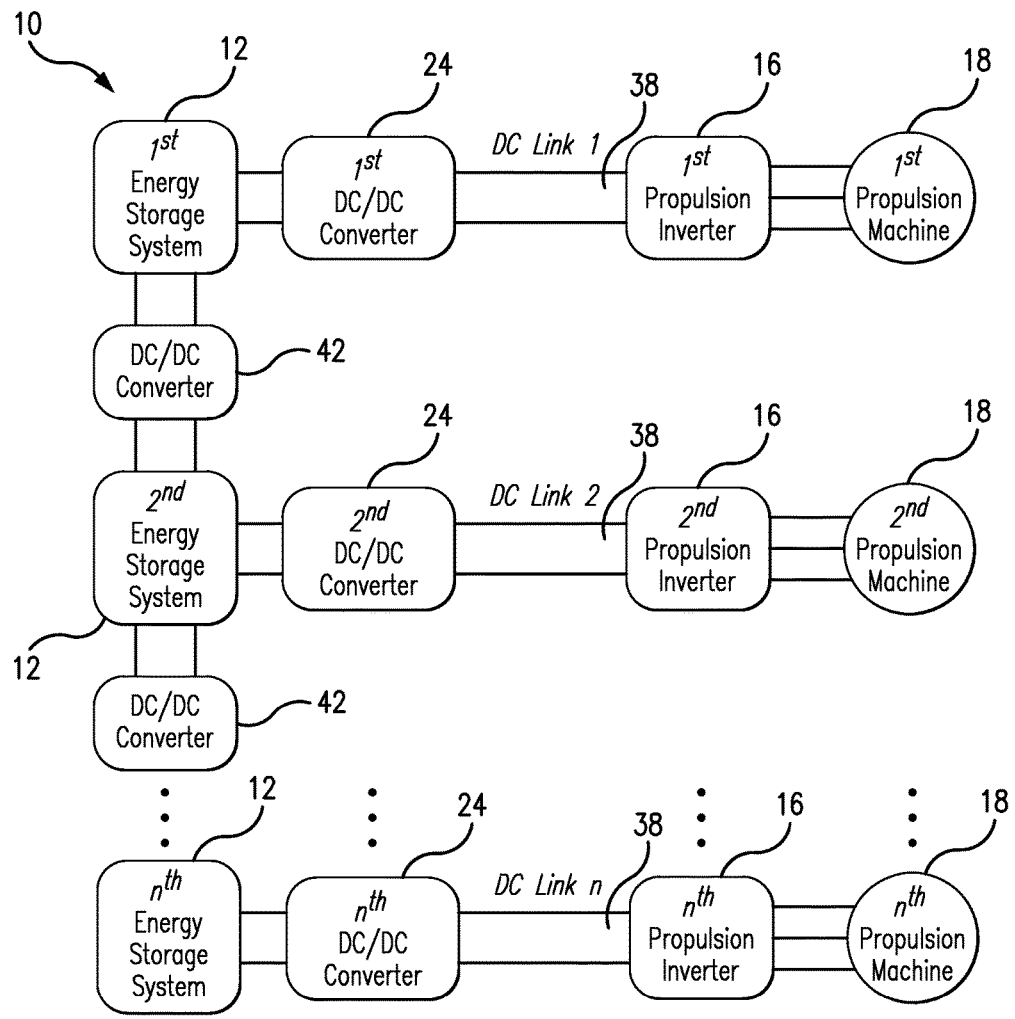
FIG. 13 is a schematic representation of the subject powertrain system where K Energy Storage Sub-Systems are connected through N DC-to-DC converters to N Propulsion Machines through independent DC Links with additional power converters coupled between all or some of the Energy Storage Sub-Systems.
Figure 14:
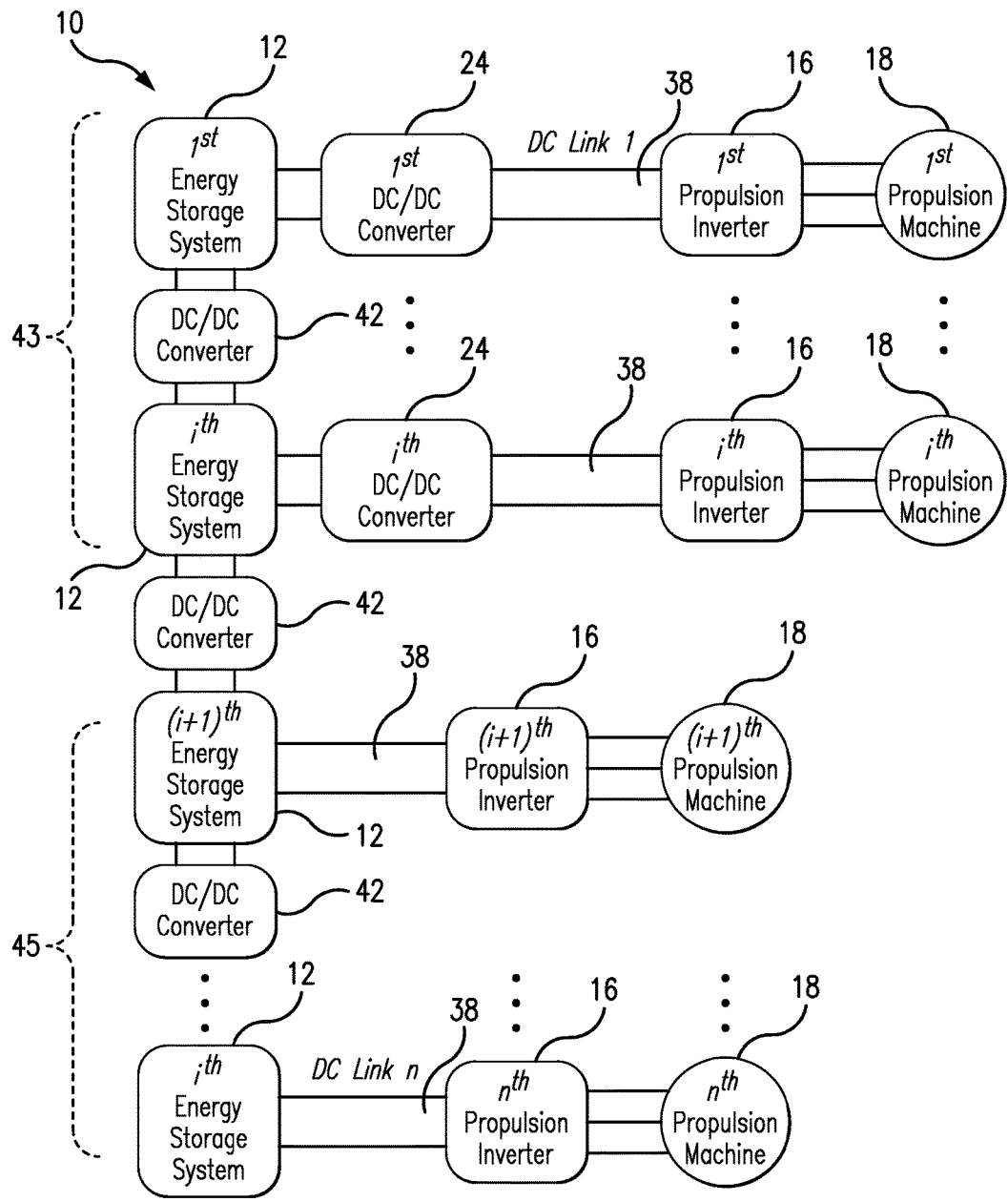
FIG. 14 is a schematic representation of the subject powertrain system where K Energy Storage Sub-Systems (with i<N) are connected to respective Propulsion Machines through independent DC Links via individual DC-to-DC converters, and the rest of the ESSs are directly connected through independent DC Links to the remaining Propulsion Machines, with additional converters coupled between all or some of the Energy Storage Sub-Systems.
Figure 15:
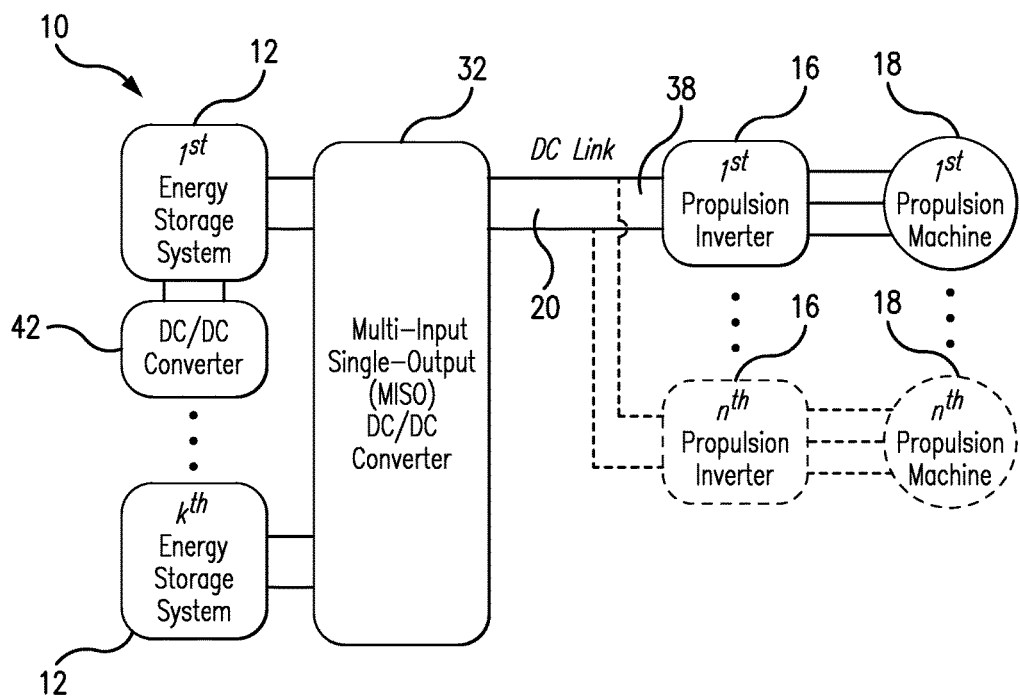
FIG. 15 is a schematic representation of the subject powertrain system where K Energy Storage Sub-Systems are connected to N Propulsion Machines through an MISO (Multiple Input-Single Output) DC-to-DC converter, with additional converters coupled between all or some of the ESSs.
Figure 16:
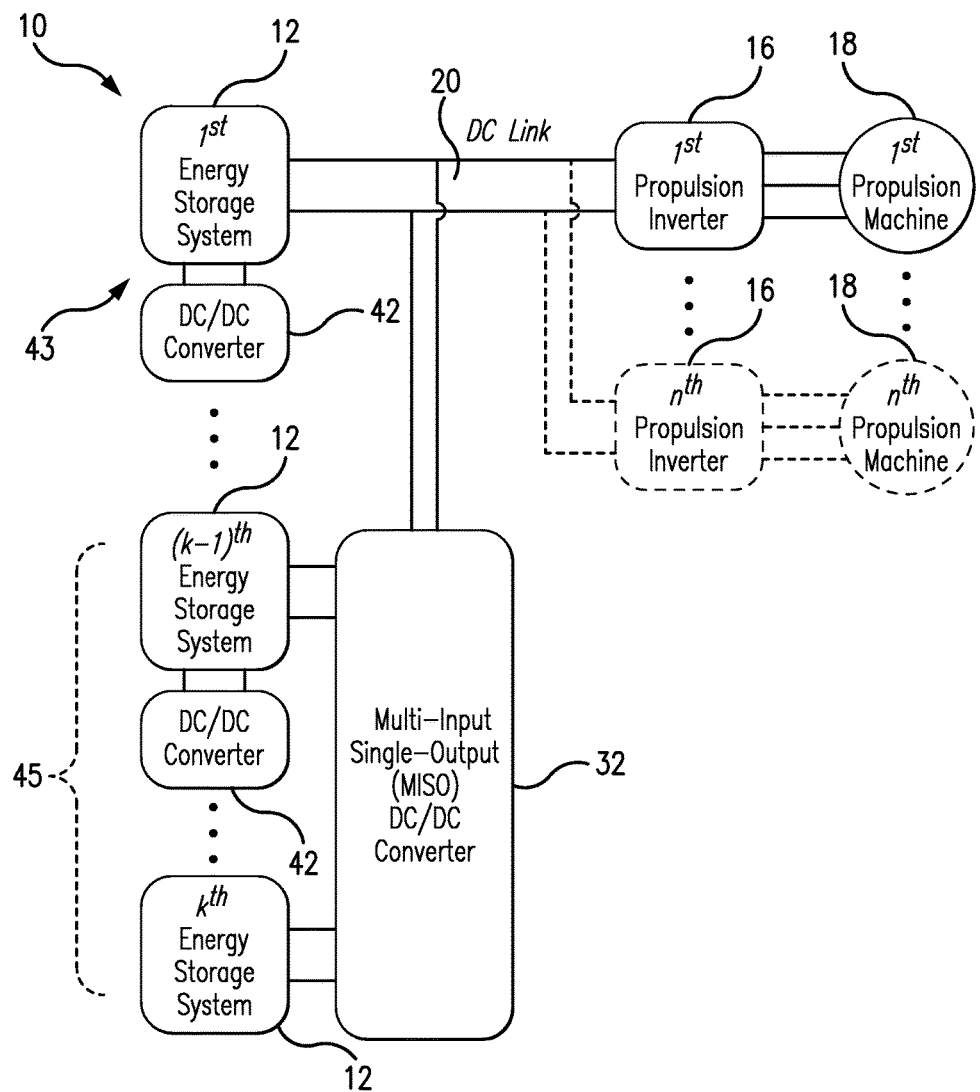
FIG. 16 is a schematic representation of the subject powertrain system where K Energy Storage Sub-Systems are connected through independent DC Links to N Propulsion Machines with one ESS directly and the rest of the ESSs through an MISO DC-to-DC converter, with additional converters coupled between all or some of the ESSs.
Figure 17:
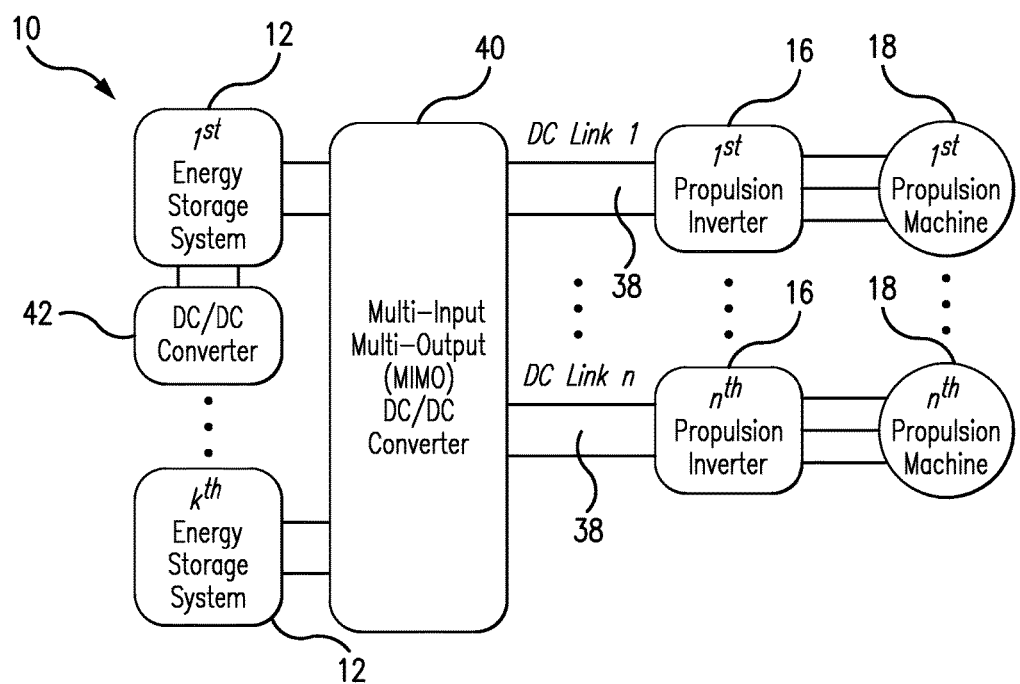
FIG. 17 is a schematic representation of the subject powertrain system where K Energy Storage Sub-Systems are connected through independent DC Links to N Propulsion Machines, via an MIMO DC-to-DC converter, with additional converters coupled between all or some of the ESSs.
Figure 18:
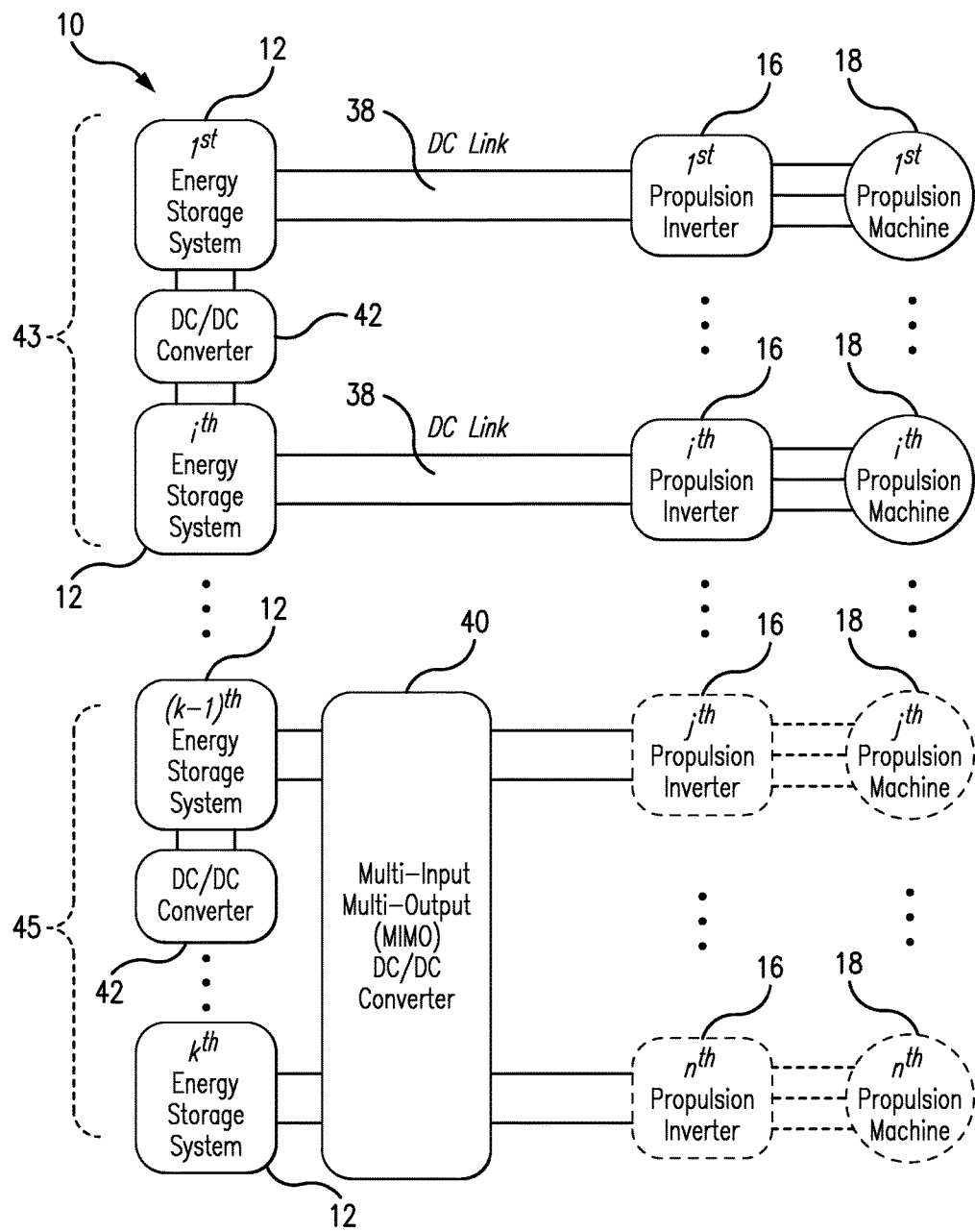
FIG. 18 is a schematic representation of the subject powertrain system with K Energy Storage Sub-Systems connected through independent DC Links to N Propulsion Machines, with one Energy Storage Sub-System directly connected and the rest of the ESSs through an MIMO DC-to-DC converter, with additional converters coupled between all or some of the ESSs.

The energy storage system (also referred to herein as sub-system) can be connected to the electric traction system either directly or through power electronic interfaces. Some possible configurations include, for example:

- Single ESS directly connected to n propulsion machines, as shown in FIG. 2;
- Single ESS connected to n propulsion machines through a single-input single-output converter, as shown in FIG. 3;
- K energy storage systems (ESSs) connected to n propulsion machines through a single input-single output converter with a direct connection of ESSs to a common DC Link, as shown in FIG. 4;
- K energy storage systems connected to n propulsion machines through K single input-single output converters, as shown in FIG. 5;
- K energy storage systems connected to n propulsion machines through a multiple input-single output converter, as shown in FIG. 6;
- K energy storage systems connected to n propulsion machines, with one ESS connected directly and remaining ESSs connected through a multiple input (j-input, j<K)-single output converter, as shown in FIG. 7;
- K energy storage systems connected to n propulsion machines through independent DC Links with a multiple input-multiple output converter, as shown in FIG. 8;
- K (K=n) energy storage systems connected to n propulsion machines through independent DC Links with n individual single input-single output converters, as shown in FIG. 9;
- K energy storage systems connected to n propulsion machines through independent DC Links, with some ESSs connected directly and other ESSs connected through j<n) individual single input-single output converters, as shown in FIG. 10;
- K (K=n) energy storage systems connected directly to n propulsion machines through independent DC Links, as shown in FIG. 11;
- K (K=n) energy storage systems connected directly to n propulsion machines through independent DC Links, with additional converters between all or some of the energy storage sources, as shown in FIG. 12;
- K (K=n) energy storage systems connected to n propulsion machines through independent DC Links via n DC/DC converters, with additional converters between all or some of the energy storage sources, as shown in FIG. 13;
- K (K=n) energy storage systems with i (i<n) connected to respective propulsion machines through independent DC Links via individual DC-to-DC converters, and with the remainder directly connected to the remaining propulsion machines via independent DC Links, with additional converters between all or some of the ESSs, as shown in FIG. 14;
- K energy storage systems connected to n propulsion machines, through a multiple input-single output (MISO) DC-to-DC converter, with additional converters between all or some of the ESSs, as shown in FIG. 15;
- K energy storage units connected to n propulsion machines, with one ESS connected directly and the remaining ESSs connected through a MISO DC-to-DC converter, with additional converters between all or some of the ESSs, as shown in FIG. 16;
- K energy storage systems connected to n propulsion machines through independent DC Links with a multiple input-multiple output (MIMO) DC-to-DC converter, and with additional converters connected between all or some of the ESSs, as shown in FIG. 17; as well as
- K energy storage systems connected to n propulsion machines through independent DC Links, with i ESSs directly connected and the rest of the ESSs connected through a MIMO DC-to-DC converter, with additional converters between all or some of the ESSs, as shown in FIG. 18.

Any possible combinations of the configurations shown in FIGS. 2-18 are also contemplated in the subject powertrain system.

In one of the embodiments shown in FIG. 2, a single Energy Storage Sub-System (ESS) 12 is connected to the DC Link 20. In this implementation, multiple Propulsion Machines 18, i.e., from 1 to n, are connected to the common DC Link 20.

A Maximum Efficiency Tracker Sub-System 22 may be included in the subject powertrain to track the power requirements of the Propulsion Machines in order to efficiently split power therebetween by dynamically controlling their associated Inverters 16. This approach aids in extending the ESS's usability and lifetime. An Inverter Controller Sub-System 17 is coupled to the output of the Maximum Efficiency Tracker Sub-System 22 to acquire readings of the operational power requirements of the Propulsion Machines, and accordingly controls the Propulsion Inverters when needed to dynamically redistribute power received from the ESS 12 between the Propulsion Machines 18. The power tracking-adjustment scheme presented in FIG. 2, is also contemplated for other configurations presented in FIGS. 3-18 as well.

In the proposed multiple-propulsion machine based powertrain, the torque coupler sums up the torques generated by propulsion machines. For example, in the architecture, containing a two-propulsion machine powertrain, propulsion machines are connected to the same shaft, which enables them to rotate at the same angular frequency ($\omega=\omega_1=\omega_2$).

In rotating mechanical systems, the mechanical power is the product of torque and angular frequency, and can be expressed as $$P_m(t)=\omega(t)\cdot(\tau_1(t)+\tau_2(t)) \qquad \text{(Eq. 1)}$$

where $\tau_1$ and $\tau_2$ represent the torques of first and second propulsion machines.

This configuration allows choosing two propulsion machines with different rpm-torque characteristics, such that each propulsion machine can be operated at a different torque. As each propulsion machine has different electrical-to-mechanical power conversion efficiency points corresponding to each rpm-torque, the total efficiency of the propulsion machines may be maximized with a proper torque-splitting strategy.

The Maximum Efficiency Tracker sub-system 22, which is a torque-splitting controller, is related to speed/torque demands commanded by the driver.

The efficiency points corresponding to each speed-torque are obtained from efficiency maps specific to each propulsion machine. Thus, efficiency of each propulsion machine may be denoted as $$\eta_1(t)=f(\omega(t),\tau_1(t)) \quad \text{(Eq. 2)}$$

$$\eta_2(t)=f(\omega(t),\tau_2(t)) \quad \text{(Eq. 3)}$$

The optimal efficiency operation of propulsion machines may be found by $$P_e(t)=\min[f_1(\omega,\tau_1(t),\eta_1(t))+f_2(\omega,\tau_2(t),\eta_{72}(t))] \quad \text{(Eq. 4)}$$

where $$f_n(t) = \begin{cases} \dfrac{\omega(t)\cdot\tau_n(t)}{\eta_n(t)} & \text{if } \tau_n(t) \geq 0 \\ \omega(t)\cdot\tau_n(t)\cdot\eta_n(t) & \text{otherwise} \end{cases} \quad \text{(Eq. 5)}$$

The functions f1 and f2 may be embedded as an offline look-up table which can be used to determine the torques of first and second electric machines such that Pe (t) in Eq. 4 attains its minimum value.

In an alternative embodiment of the subject powertrain system 10, shown in FIG. 3, a single Energy Storage Sub-System (also referred to herein as Energy Source) 12 is connected to the DC Link 20 via a power converter 24.

The power electronic converter 24 may be a bi-directional DC-to-DC converter. Alternatively, in the case of Energy Storage Sub-Systems 12 with AC outputs (such as, for example, flywheels), the subject topologies may include AC-to-DC converter(s), or DC-to-AC bi-directional converter(s).

As an example only, but not to limit the subject powertrain system to this particular implementation, the power converter(s) 24 will be presented further herein as DC-to-DC converter(s), although other types of power converters are contemplated in the subject system as well.

In FIG. 3, multiple Propulsion Machines 18 are connected to the common DC Link 20. This architecture is viable, for example, if the voltage of the ESS 12 is greater or lower than the operating voltage range of the Inverter 16, such that ESS's voltage may be stepped up or stepped down to fulfill the DC Link's voltage variations in accordance with the power requirements of the Propulsion Machine(s) 18.

In another alternative embodiment of the subject powertrain 10, depicted in FIG. 4, multiple on-board Energy Sources (or Energy Storage Sub-Systems) 12 are employed. In this topology, one of the Energy Sources 12 (i.e., the $1^{st}$ ESS) is connected to the common DC Link 20 directly. Remaining ESSs (Energy Storage Sub-Systems) 12, i.e., $2^{nd}$-$k^{th}$ ESSs, are connected to the DC Link 20 via corresponding DC-to-DC converters 24. Each ESS 12 in this group is coupled to the DC Link 20 via a designated DC-to-DC converter 24. The Propulsion Machine-Inverter Groups 14 are connected to the same common DC Link 20.

In the architecture presented in FIG. 4, a Supervisory Energy Management (SEM) Strategy Sub-System (also referred to herein as an Energy Management Controller) 26, may be included to dynamically split the power among the ESSs 12 by providing power references (or power requirements signals) 28 to the local controllers 30 of the DC-to-DC converters 24 in accordance to the readings acquired from the Maximum Efficiency Tracker Sub-System 22. The deployed DC-to-DC converter 24 may be used in this topology to interface the voltage levels provided by the ESSs 12 with the DC Link 20, and to control the power flow between the ESSs 12. The Energy Management Strategy Scheme presented in FIG. 4 is fully applicable to other configurations presented herein as well.

The benefits associated with ESS hybridization is maximized if an appropriate and effective energy/power load sharing algorithm is adopted. Such a load sharing algorithm does not only increase the performance of the system with better dynamic performance and improved power density but also enhances the main energy sources lifetime, such as, for example, a battery, through decreasing instantaneous discharge rate.

In addition, the Energy Management Controller 26 is responsible for maintaining state-of-charge (SOC) level of the on-board low-energy sources such as ultra-capacitors, and recovery to optimal value.

The Supervisory Energy Management Controller 26 may be rule based or optimization based. For example, for rule based approaches (such as fuzzy logic controller), the information on demanded power and SOC of low-energy source are required to determine output powers for high-energy and low-energy sources.

The rules to determine output reference powers may be selected based on experts' knowledge to accomplish certain objectives. These objectives may include, but not limited to, SOC charge sustain of low-energy sources, meeting the total load demand commanded by the driver, outputting base and transient-free power from the high-energy source to extend its lifetime, etc. Based on the defined rules, the Supervisory Energy Management Controller 26 generates the power references for ESSs. These power references are transmitted to DC-to-DC converters, which regulate the power flows between ESSs, or ESS-Inverters/Propulsion Machines, accordingly.

In another embodiment of the subject powertrain system 10, shown in FIG. 5, multiple (i=1–k) on-board Energy Sources (or Energy Storage Sub-Systems) 12 are connected to the common DC Link 20 via dedicated individual DC-to-DC converters 24. Multiple Propulsion Machines (i=1–n) are connected to the common DC link 20. In this topology, the number of DC-to-DC converters 24 corresponds to the number of the ESSs 12 in the system 10. This structure offers enhanced flexibility in terms of power flow control.

Shown in FIG. 6 is an alternative configuration of the topology for the subject powertrain system 10, which includes multiple (i=1=k) on-board ESSs 12 which are interfaced with a Multiple Input-Single Output (MISO) converter 32, which may be, for example, a DC-to-DC converter connected to the common DC Link 20. Multiple (i=1–n) Propulsion Machines 18 are connected to the common DC Link 20.

This architecture may reduce the size and cost of the design due to replacing individual DC-to-DC converters 24 (of FIG. 5) with an integral MISO converter 32. In general, control flexibility of the MISO converter 32 might be limited due to sharing some of the converters' components.

In another alternative embodiment depicted in FIG. 7, a number (k) of Energy Storage Sub-Systems 12 are connected to n Propulsion Machines. In this embodiment, the number K of the ESSs 12 is divided in a first group 34 of the ESSs and a second group 36 of the ESSs. In the group 34, at least one ESS 12 is directly coupled to the DC Link 20, to act as a power buffer to respond faster to the voltage transients. In the group 36, the ESSs 12 are coupled to the DC Link 20 through a multiple input (j-input, j<K)-single output (MISO) converter 32, which, for example, may be the MISO DC-to-DC converter. Multiple (i=1-n) Propulsion Machines 18 are connected to the common DC Link 30.

In an additional embodiment of the subject powertrain system 10, shown in FIG. 8, a number n of independent DC Links 38 are employed. Each Propulsion Machine-Inverter Group 14 is connected to a respective individual DC Link 38. The Energy Sources 12 are connected to a Multiple Input-Multiple Output (MIMO) converter 40, for example, a DC-to-DC MIMO converter. The outputs of the MIMO converter 40 are connected to the independent DC Links 38.

Shown in FIG. 9, is a further alternative topology of the subject powertrain system 10, in which a number i=1-n of Energy Sources 12 are connected to a number i=1-n of independent DC Links 38 via a number i=1-n of DC-to-DC converters 24. The string architecture shown in FIG. 9 allows controlling each Propulsion Machine 18 through a different Energy Source 12 which enhances the flexibility of the power flow control in the system 10.

In an additional alternative embodiment of the subject powertrain 10, shown in FIG. 10, some of the energy sources (for example, the ESS in group 34) are directly connected to the Propulsion Machines through independent DC Link 38. The rest of the Energy Sources (for example, the ESS in the group 36) are interfaced with the dedicated DC-to-DC converters 24. Each Propulsion Machine-Inverter Group 14 is connected to a corresponding independent DC Link 38.

Shown in FIG. 11, is an additional alternative embodiment of the subject powertrain system 10, where K (K=n) Energy Storage Sub-Systems 12 are connected directly to n Propulsion Machines via corresponding independent DC Links 38, each extending between a respective ESS 12 and a corresponding Propulsion Machine-Inverter Group 14.

In another alternative embodiment of the subject system 10, shown in FIG. 12, the Energy Storage Sub-Systems 12 are directly connected to the Propulsion Machines 12 through respective independent DC Links 38. DC-to-DC converters 42 are coupled between respective Energy Sources 12 to control power flow therebetween. This topology is capable of enabling a cost effective and flexible solution without individual converters 24 which would be dedicated to each Energy Storage Sub-System 12.

The function of the converters 42 that are connected between ESSs 12 is to control the power flow among ESSs, as well as interface ESSs of different voltages. The power references for ESSs generated by the Supervisory Energy Management (SEM) controller 26 are transmitted to the local controllers of DC-to-DC converters. With the information of ESS voltage, and current feedback, the local controller of DC-to-DC converter adjusts the duty cycles of the switches such that the output power of DC-to-DC converters matches with the reference power. DC-to-DC converters allow controlling power outputted from ESSs according to the power references generated by the SEM controller 26.

Referring to FIG. 13, the subject topology includes K (K=n) of Energy Storage Sub-Systems 12 connected through n converters 24 (for example, DC-to-DC converters) to n Propulsion Machines 18 with additional converters 42 coupled between all (or some) of the Energy Storage Sources 12. A plurality of independent DC Links 38 are coupled between respective ESSs 12 and Inverters 16.

Referring to FIG. 14, a plurality of K (K=n) Energy Storage Sub-Systems 12 are composed of a group 43 and a group 45 of ESSs 12. In the group 43, the number i (i<n) of the ESSs 12 are connected to respective $1^{st}$ through $i^{th}$ propulsion machines 18 through individual DC-to-DC converters 24 and the independent DC Links ($1^{st}$-$i^{th}$). The remaining ESSs 12, i.e., the $(i+1)^{th}$ through $n^{th}$ ESSs in the group 45 are directly connected to n Propulsion Machines 18 via independent DC Links $(i+1)^{th}$ through $n^{th}$. Additional converters 42 are coupled between respective ESSs 12, i.e., between each two of the ESSs, or some of them.

FIG. 15 depicts another implementation of the subject powertrain system 10 which includes K Energy Storage Sub-Systems 12 connected to n Propulsion Machines 18, through a DC-to-DC MISO converter 32, with additional converters 42 connected between all or some of the ESSs 12. All Propulsion Machines in this configuration are coupled to the common DC Link 20.

Furthermore, as shown in FIG. 16, a number K of Energy Storage Sub-Systems 12 are connected to n Propulsion Machines with the $1^{st}$ ESS 12 directly coupled to the common DC Link 20, and the rest of the ESSs 12, i.e., the $(k-1)^{th}$ ESS through $k^{th}$ ESS, coupled to the common DC Link 20 through the MISO converter 32, with additional converters 42 connected between all or some of the ESSs 12.

In another alternative implementation of the subject powertrain system 10, shown in FIG. 17, a number K of the Energy Storage Sub-Systems 12 are connected to n Propulsion Machines 18 through independent DC Links 38 via a MIMO converter 40, for example, DC-to-DC converter, with additional converters 42 coupled between all or some of the ESSs 12.

Also, as presented in the topology depicted in FIG. 18, a number K of the Energy Storage Sub-Systems 12 are connected to n Propulsion Machines. $1^{th}$ ESS through $i^{th}$ ESS are connected directly through the independent DC Links 38. The ESSs $(k-1)^{th}$ through $k^{th}$ are connected through a MIMO DC-to-DC converter 40. Additional converters 42 are connected between all or some of the ESSs 12.

The inclusion of independent DC Links in the subject structures presented in FIGS. 8-14 and 17-18 may improve the operation of the subject powertrain system. Specifically:

a) With this configuration, DC Link voltages may be optimized with respect to the propulsion machine type, input voltage range and voltage/current profile of the electric machines; and b) The transients of any particular independent DC Link 38 would not interfere with other independent DC Links 38.

Figure 19:
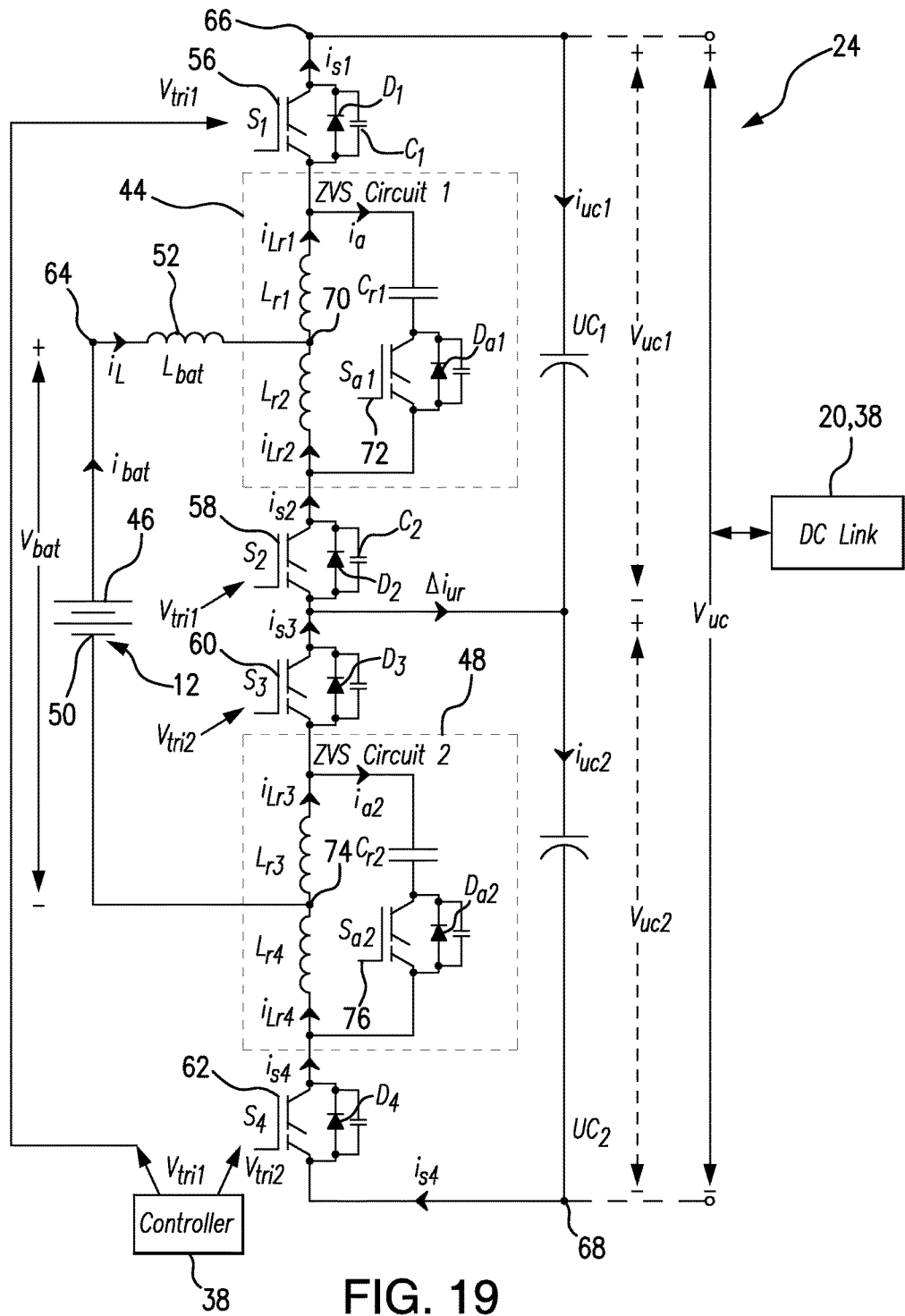
FIG. 19 is a schematic representation of a topology of the bi-directional ZVS three-level buck/boost DC-to-DC converter in the subject powertrain system.

Referring to FIG. 19, as one of the examples of the subject system implementation, a bi-directional ZVS (zero-voltage switching) DC-to-DC converter 24, is interconnected between the ESS (for example, a battery) 12 and a DC link 20 (or 38) in an Electric Vehicle drive system.

The DC-to-DC converter 24 includes a ZVS circuit 44 coupled to a terminal 46 of the battery (ESS) 12, and a ZVS circuit 48 coupled to the terminal 50 of the battery 12. As shown in FIG. 19, the ZVS circuit 44 is coupled to the terminal 46 of the battery 12 through a transfer inductor 52.

The DC-to-DC converter 24 further includes four main switches including switch $S_1$, switch $S_2$, switch $S_3$, and switch $S_4$. Switches $S_1$-$S_4$, are built with a solid-state element, for example, respective Insulated-Gate Bipolar Transistors (IGBTs) 56, 58, 60 and 62, each of which has a respective diode ($D_1$, $D_2$, $D_3$, and $D_4$), which are body diodes of IGBTs.

The main switch S1 is connected to the node 64 (at the terminal 48 of the battery 12).

The main switches $S_2$ and $S_3$ are coupled in series between the ZVS circuit 44 and the ZVS circuit 48. The collector of the main switch $S_4$ is connected to the ZVS circuit 48, and the emitter of the main switch $S_1$ is coupled to the ZVS circuit 44.

Two split DC link capacitors $UC_1$ and $UC_2$ are connected in series each to the other, and both $UC_1$ and $UC_2$ are connected in parallel between the nodes 66 and 68, at the collector of the main switch S₁, and at the emitter of the main switch S₄, respectively.

The ZVS circuit 44 includes two small size resonance inductors $L_{r1}$, $L_{12}$ coupled at the node 70 to the transfer inductor 52 opposite to the node 64. A resonant capacitor $C_{r1}$ and an auxiliary switch $S_{a1}$ are connected in series and together in parallel to the resonance inductors $L_{r1}$ and $L_{r2}$. Similar to the main switches S₁-S₄, the auxiliary switch $S_{a1}$ may be based on an IGBT 72. The IGBT 72 has an intrinsic body diode $D_{a1}$.

Similar to the ZVS circuit 44, the ZVS circuit 48 includes two small size resonance inductors $L_{r3}$ and $L_{r4}$ coupled by their interconnection node 74 to the terminal 50 of the battery 12. The resonance inductors $L_{r3}$ and $L_{r4}$ are connected in series each to the other, and together are connected in parallel to the resonant capacitor $C_{r2}$ and the auxiliary switch $S_{a2}$. Similar to the auxiliary switch $S_{a1}$, the auxiliary switch $S_{a2}$ may be based on an IGBT 76, which has an intrinsic body diode $D_{a2}$.

The ZVS circuit 44 and ZVS circuit 48 are utilized to reduce, or even eliminate the turn-on switching losses of the main switches S1-S4 in all operation modes.

The auxiliary switches $S_{a1}$ and $S_{a2}$ are turned ON with ZVS (zero-current-switching) and turned OFF with ZVS (zero-voltage-switching). Therefore, there are negligent additional switching losses attributed to the auxiliary switches in the circuitry of the current DC/DC converter 24.
Basic Operation Modes of the Bi-Directional ZVS Converter 10

The major operation modes of the subject DC/DC converter 24 include a boost mode taking place when the power flow is directed from the ESS (for example, a battery) 12 to the DC link 20, and a buck mode when the energy flow is directed from the DC Link 20 to the battery 12.

The DC/DC converter 24 operates with three voltage levels which indicate the ones applied to the inductor 52. The three output voltage levels include the voltage level $V_{uc}$, the voltage level $V_{uc1}=V_{uc2}=V_{uc}/2$, and voltage level of 0V. Therefore, the inductor voltage can be $V_{in}$ (also referred to herein as $V_{bat}$), $V_{in}-V_{uc/2}$, and $V_{in}-V_{uc}$. For the balanced system, $V_{uc1}=V_{uc2}$.

Each mode of operation includes several equivalent circuits due to different switching combinations. Depending on the operation mode, only two main switches are ON, while the other two main switches are always turned OFF.

In the boost mode of operation, main switches S₂ and S₃ are pulse-width-modulated, while the main switches S₁ and S₄ are kept at the OFF state. Oppositely, in the buck mode of operation, the switches S₁ and S₄ are Pulse-Width-Modulated (PWM), while the main switching S₂ and S₃ are OFF.

Figure 21A:
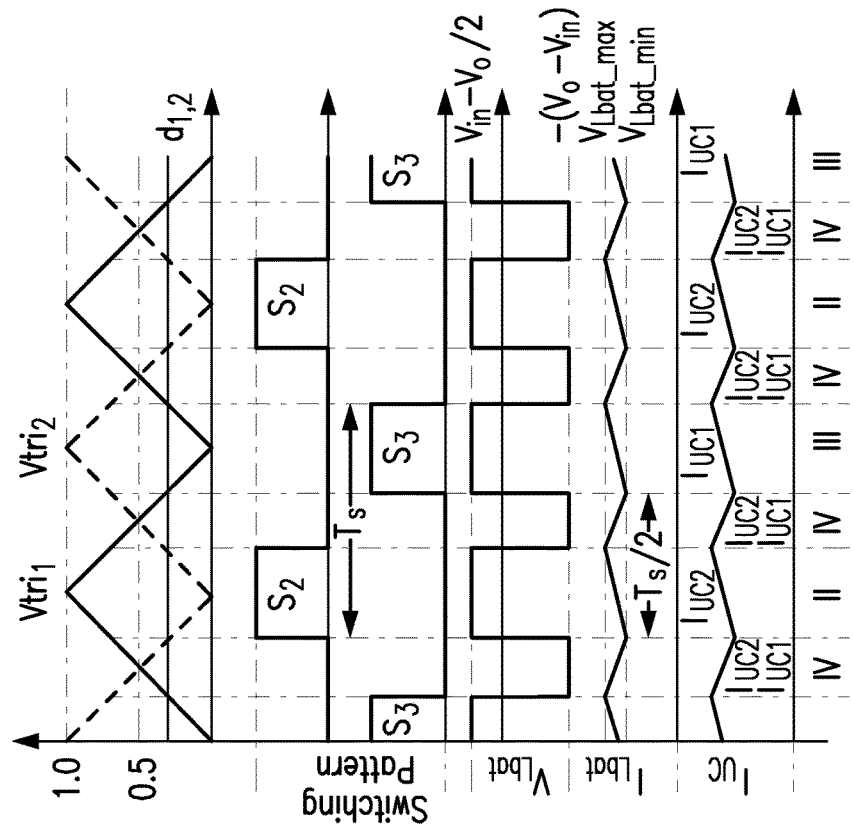
FIGS. 21A-21B are diagrams representative of the operation waveforms and the sequences of operational modes during the boost mode of operation with D>0.5 (FIG. 21A) and D<0.5 (FIG. 21B)
Figure 21B:
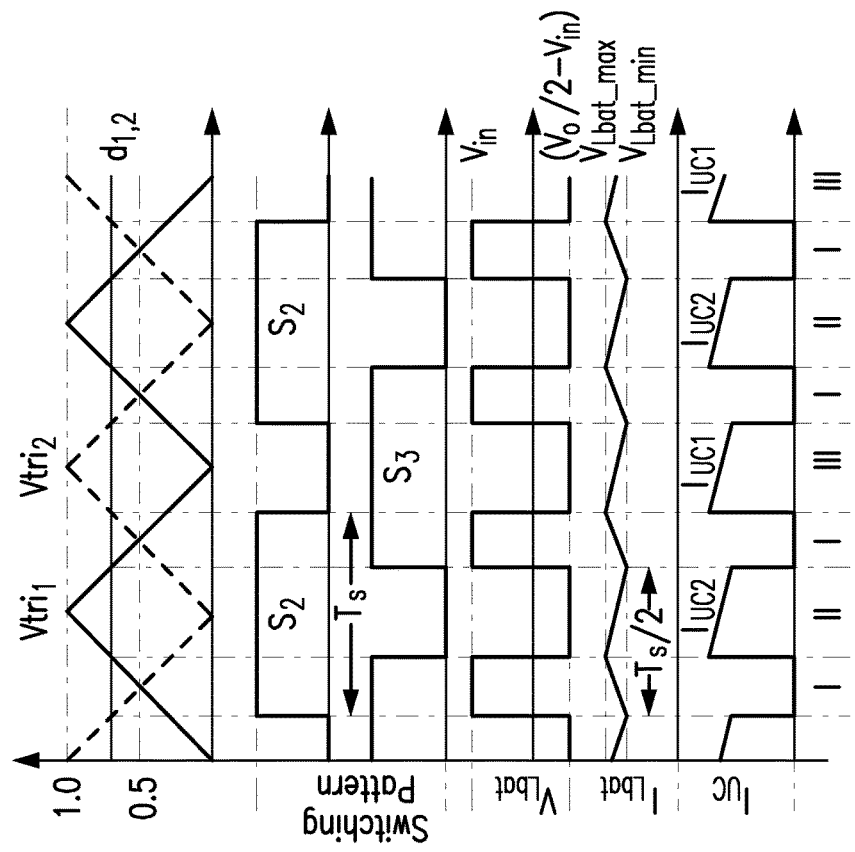
Figure 22:
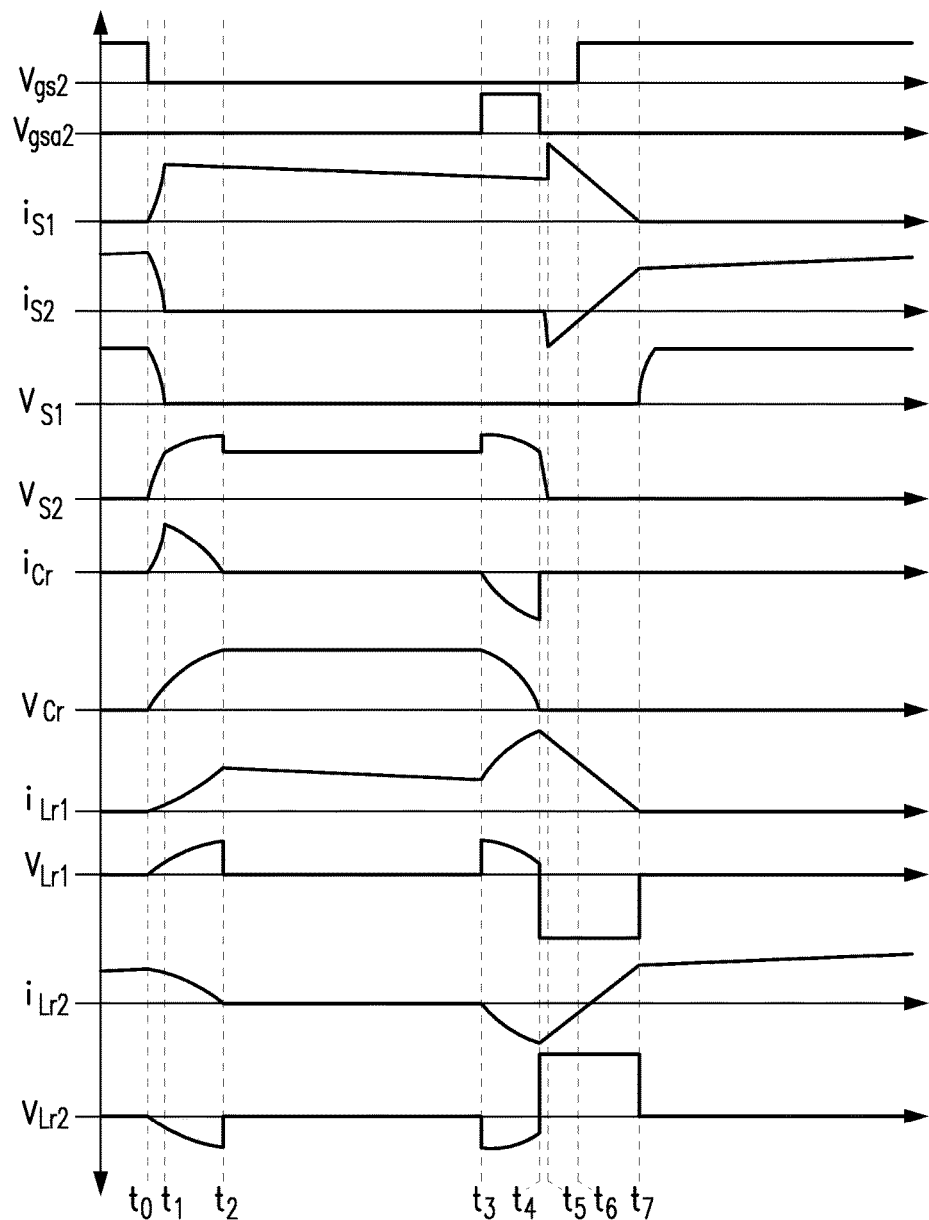
FIG. 22 is a diagram representative of the circuit waveforms during the transition of switch S2 from OFF state to ON state, when D>0.5.

The switching scheme of the boost and buck modes of operation are similar to each other in the sense that the same duty cycle is used for a selected main switch pair S₂/S₃ in the boost mode, or S₁/S₄ in the buck mode) in which the main switches are controlled with two signals, for example triangle control signals, $V_{tri1}$ and $V_{tri2}$ which, as shown in FIGS. 21A-21B, have 180° phase shift.

The triangle signal $V_{tri1}$ is the reference signal used for creating the gate pulses for either S₁ or S₂ depending on the operation mode. $V_{tri2}$ is the reference triangle signal which is used for creating the gate pulses for either of the main switches S₃ or S₄.

The periods of the triangle signals $V_{tri1}$ and $V_{tri2}$ determine the switching frequency for the related switches. When the value of the duty cycle d is higher than the value of the triangle signal $V_{tri1}$ or $V_{tri2}$, a corresponding main switch is turned ON. Thus, the switch turn-on time is phase-shifted, resulting in an effective output frequency (the frequency of the input and output currents) which is twice as high as the switching frequency, as will be presented infra with regard to FIGS. 21A-21B.

As an example only, but not to limit the scope of the present invention to a single mode of operation, the operation modes of the current DC/DC converter 24 will be detailed with reference to the boost mode of operation. The equivalent circuits in the buck mode are substantially similar to the equivalent circuits achieved during the boost mode of operation.

In the boost mode of operation, the main switches S₁ and S₄ are always kept at the OFF state, where the switching state combinations of the main switches 59 and S₃ form different equivalent circuits, which take place in producing a predetermined sequence during the boost operation mode, as will be presented in further paragraphs.

Without considering the ZVS circuits 44, 48, which affect the circuit operation only during a short period of time (particularly, during the instances when a corresponding main switch coupled to the ZVS circuit is turned ON), the operation of the DC/DC converter may be divided into 4 modes presented in FIGS. 20A-20D.

Mode I

Figure 20A:
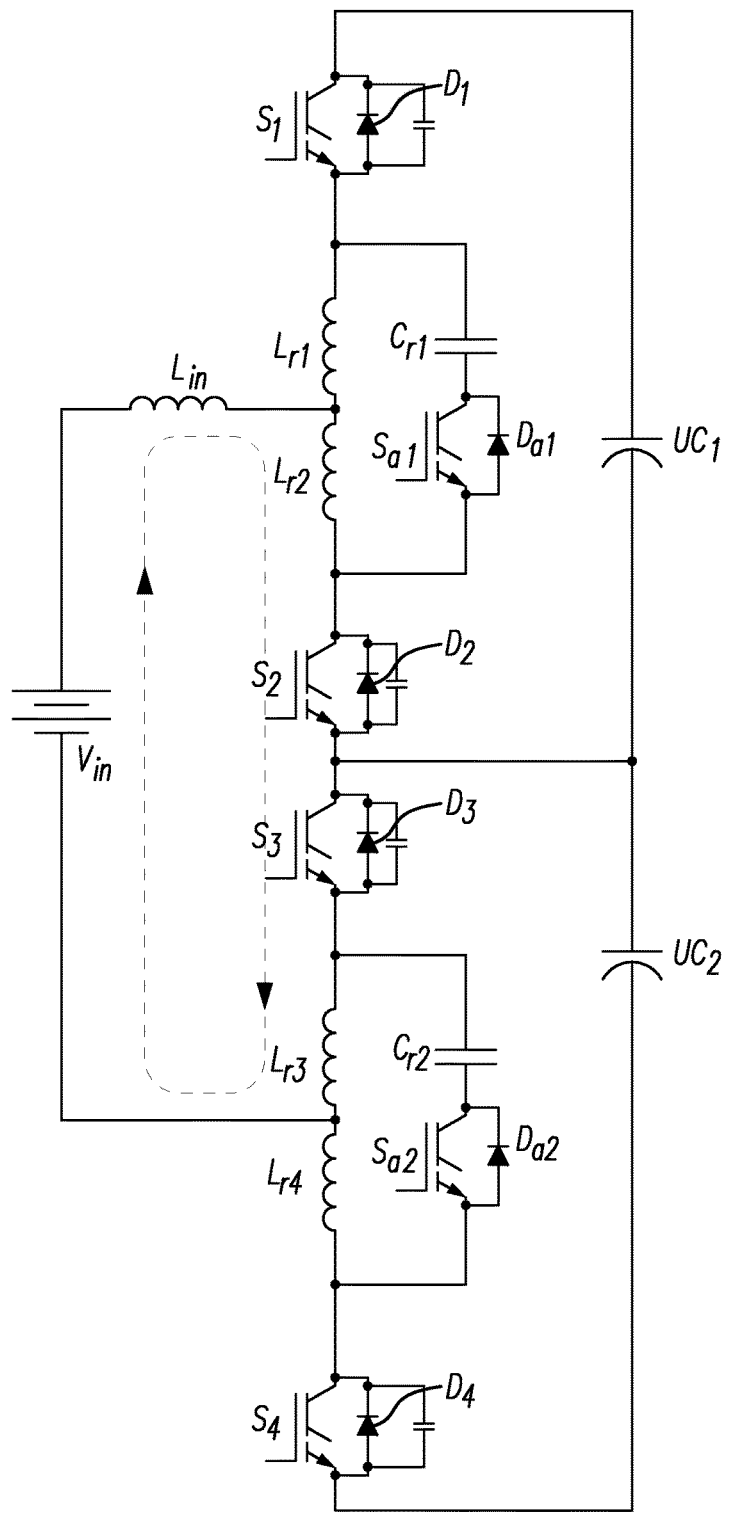
FIGS. 20A, 20B, 20C, and 20D are diagrams representing equivalent circuits of the converter of FIG. 19 during the boost mode of operation with S2 and S3 ON (FIG. 20A), S2 on and S3 OFF (FIG. 20B), S2 OFF and S3 ON (FIG. 20C), and S2 and S3 OFF (FIG. 20D)

The equivalent circuit for the interval of Mode I is shown in FIG. 20A. In this mode, both main switches S₂ and S₃ are ON (switches are closed). The transfer inductor 52, $L_{bat}$, (also referred to herein as $L_{in}$), stores energy with the battery voltage $V_{bat}$ across its terminals. Neglecting the internal resistances, the inductor current ripple can be expressed as $$\frac{di_L(t)}{dt} = \frac{V_{bat}(t)}{L_{bat}} \qquad \text{Eq. (6)}$$

Mode II

Figure 20B:
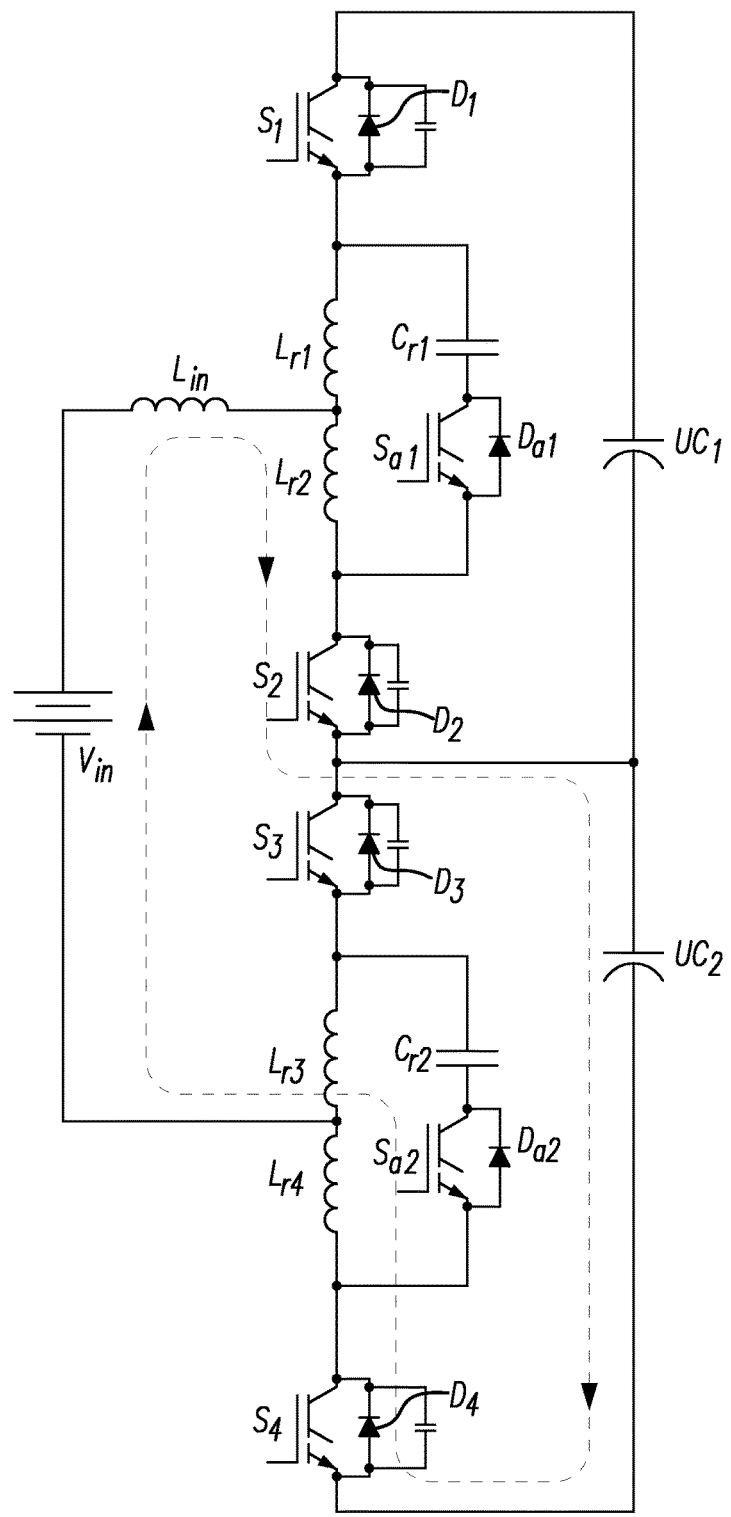

The equivalent circuit for the interval of the Mode II is illustrated in FIG. 20B. In Mode II, the main switch S₂ is ON, while the main switch S₃ is OFF. The body diode $D_4$ of the main switch S₄ is conducting, and the capacitor $UC_2$ is charged.

The inductor current $I_L$ may increase or decrease depending on the duty cycle value. When the duty cycle is 0.5, the battery voltage $V_{bat}$ ($V_{in}$) is equal to half of the UC bank voltage. Therefore, if the DC/DC converter 10 operates in the boost mode with a duty cycle d lower than 0.5, the voltage of the $UC_2$ will be higher than that battery voltage, and the conductor current $I_L$ will decrease. On the other hand, if the duty cycle is higher than 0.5, the voltage of $UC_2$ will be lower than the battery voltage, and the inductor current $I_L$ will increase. Inductor current ripples can be generally expressed as $$\frac{di_L(t)}{dt} = \frac{V_{bat}(t) - V_{UC2}(t)}{L_{bat}} k \begin{cases} k = 1, \text{ if } d < 0.5 \\ k = -1, \text{ if } d > 0.5 \end{cases} \qquad \text{Eq. (7)}$$

where, "d" denotes the duty cycle ratio.

Mode III

Figure 20C:
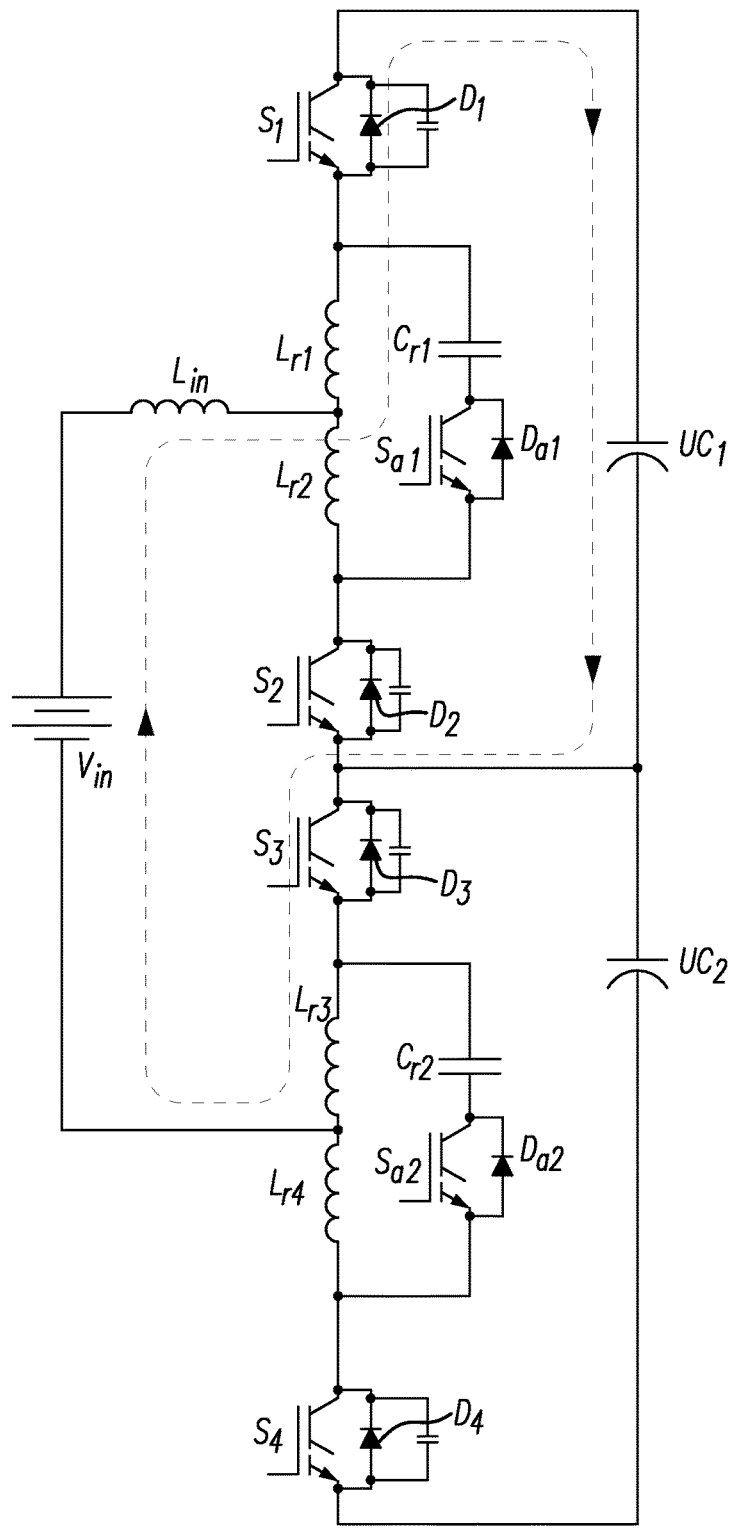

The equivalent circuit for the interval of the Mode III is presented in FIG. 20C. Similar to mode II, mode III is applicable at any specified duty cycle value. In Mode III, the main switch S₃ is ON (the switch is closed), while the main switch S₂ is OFF (the switch is opened).

In the topology, the capacitor $UC_1$ is discharged by the current $i_{UC_1}$ through the body diode $D_1$ of the main switch $S_1$. Depending on the duty cycle, the induction current $I_L$ decreases or increases as $$\frac{di_L(t)}{dt} = \frac{V_{bat}(t) - V_{UC1}(t)}{L_{bat}} k \begin{cases} k = 1, \text{ if } d < 0.5 \\ k = -1, \text{ if } d > 0.5 \end{cases} \quad \text{Eq. (8)}$$

Mode IV

Figure 20D:
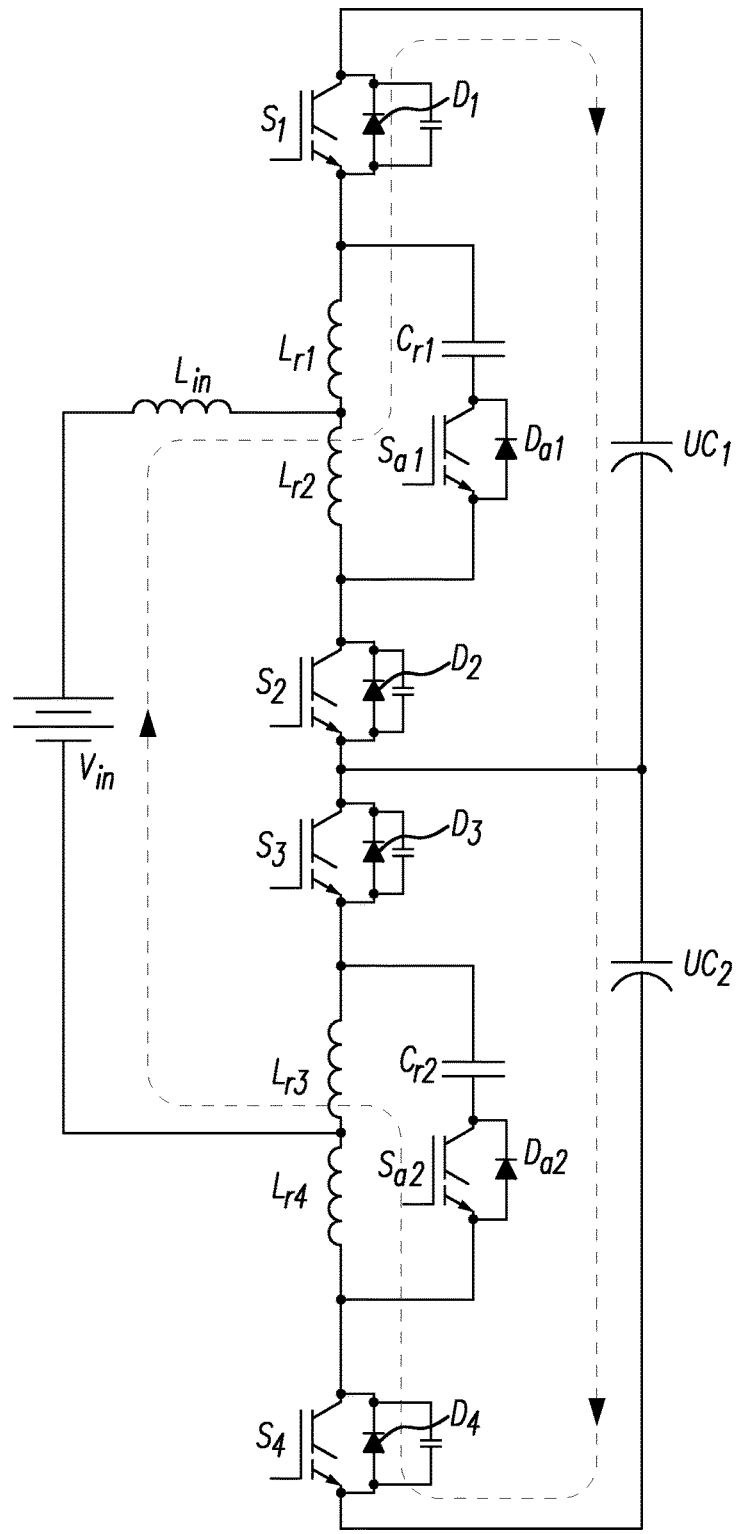

The equivalent circuit for the Mode IV is presented in FIG. 20D. In Mode IV, both main switches $S_2$ and $S_3$ are turned OFF (the switch is opened). The inductor current $I_L$ continues to charge the UC banks through the body diodes $D_1$ and $D_4$ of the main switches $S_1$ and $S_4$. Mode IV is used only when the duty cycle is lower than 0.5.

The voltage across the inductor 52 is the difference between the battery voltage $V_{bat}$ and UC bank voltage $V_{uc}$. The inductor current $I_L$ decreases with a constant slope. The current variation of $I_L$ can be expressed as $$\frac{di_L(t)}{dt} = \frac{V_{UC}(t) - V_{bat}(t)}{L_{bat}} \quad \text{Eq. (9)}$$

where $V_{UC}(t)$ is the sum of $V_{UC1}(t)$ and $V_{UC2}(t)$.

The climax value of the duty cycle is 0.5. Based on the duty cycle value (d<0.5 or d>0.5), the sequence of the equivalent circuits is separated into two categories. Basically, if the duty cycle is lower than 0.5, the sequence of equivalent circuits is Mode IV-Mode II-Mode IV-Mode III. This sequence of modes repeats itself during the DC-to-DC converter operation. During this sequence mode, mode I does not occur. Since the control signals of the main switch are displaced by 180° each with respect to another, as the duty cycle increases to over 0.5, the control signals $V_{tri1}$ and $V_{tri2}$ begin to overlap. This overlapping creates a new equivalent circuit sequence I-II-I-III, where mode IV does not occur.

The control signal generation, operation waveforms and operation mode sequences are plotted in FIGS. 21A-21B, where FIG. 21A represents the waveforms when duty cycle is higher than 0.5. It is clearly seen that the effective input and output current ripple frequency is twice of the switching frequency.

The ratio of the output voltage to the input voltage can be found through analyzing the inductor current ripple. Using Eq. (6) which represents the inductor ripple when operating in mode I and equalizing it to Eq. (7) representing mode II, the voltage ratio can be derived as $$\frac{V_0}{V_{in}} = \frac{2}{1 - d_{eff}} \quad \text{Eq. (10)}$$

where $V_0$ is the output voltage (also referred to herein as $V_{uc}$), and $V_{in}$ is the input voltage (also referred to herein as $V_{bat}$), and
where $d_{eff}$ is $$d_{eff} = (d_{s2} - 0.5) + (d_{s3} - 0.5) \quad \text{Eq. (11)}$$

where $d_{s2}$ is the duty cycle of the main switch $S_2$, and $d_{s3}$ is the duty cycle of the main switch $S_3$.

As previously presented, duty cycles of the switches in the circuitry are the same. Hence the effective duty cycle $d_{eff}$ can be rewritten as $$d_{eff} = 2 \times (d - 0.5) \quad \text{Eq. (12)}$$

The operation waveforms of the circuit in the boost mode with a duty cycle lower than 0.5 is shown in FIG. 21B.

The output to input voltage ratio is represented by Eq. 13.

$$\frac{V_0}{V_{in}} = \frac{2}{2 - d_{eff}} \quad \text{Eq. (13)}$$

where the effective duty cycle for this mode is the sum of the individual duty cycles for the contributing main switches.

$$d_{eff} d_{s2} + d_{s3} = 2 \times d \quad \text{Eq. (14)}$$

Each ZVS circuit 44, 48 contains two resonance inductors ($L_{r1}/L_{r2}$ or $L_{r3}/L_{r4}$), one resonance capacitor ($C_{r1}$ or $C_{r2}$), and an auxiliary switch ($S_{a1}$ or $S_{a2}$). The proposed ZVS circuits 44, 48 are capable of eliminating the turn-ON losses of one of the switches by creating a resonance between the inductor and capacitor. The ZVS circuit 44 is placed between the main switches $S_1$ and $S_2$ to soft switch a respective operating switch $S_1$ or $S_2$. The ZVS circuit 48 is placed between the main switches $S_3$ and $S_4$ to soft switch a respective operating switch $S_3$ or $S_4$.

In the boost mode of operation, only $S_2$ and $S_3$ are actively switched. Four different operation modes (Mode I-Mode IV) exist due to different combinations of switch states as presented supra. As presented in Table 1, the first ZVS circuit 44 is active in the boost mode of operation for soft switching of the main switch $S_2$ during transition from mode IV to mode II when duty cycle is lower than 0.5, and during transition from the mode III to I when duty cycle is higher than 0.5. The first ZVS circuit 44 is also active in the buck mode of operation to soft switch the main switch $S_1$ during mode transition II-IV (for d>0.5), and mode transition I-III (for d<0.5). The second ZVC circuit 48 is active in the boost mode of operation to soft switch the main switch S3 during transition between modes II-I (d>0.5) and between modes IV-III (d<0.5). The ZVS circuit 48 is also active in the buck mode of operation to soft switch the main switch $S_4$ during mode transition between modes III-IV (d>0.5), and transition between modes I-II (d<0.5).

The energy stored in the resonance inductor during the normal operation, is transferred to the resonant capacitor when the main switch is turned OFF. This energy is then recycled to conduct the body diode of the main switch before it is turned ON.

The ZVS cell 48 (which is identical to the ZVS cell 44) is placed between the main switches $S_3$ and $S_4$ to soft switch the switches $S_3$, $S_4$. In the boost operation, only $S_2$ and $S_3$ are actively switched and four different stages exist due to different combination of switch states as explained in previous paragraphs.

The basic operation principles of the ZVS cell are identical in each mode transition in both boost and buck operations. The ZVS cell operation according to the operation modes, transition intervals, used resonant inductor, auxiliary switch and soft-switched IGBT, is summarized in Table I.

TABLE I

Summary of the ZVS Operation

|  | Transition Stages | Resonant Inductor | Auxiliary Switch | ZVS Switch |
|---|---|---|---|---|
| Boost mode d > 0.5 | III-I | $L_{r2}$ | $S_{a1}$ | $S_2$ |
|  | II-I | $L_{r3}$ | $S_{a2}$ | $S_3$ |
| Boost mode d < 0.5 | IV-II | $L_{r2}$ | $S_{a1}$ | $S_2$ |
|  | IV-III | $L_{r3}$ | $S_{a2}$ | $S_3$ |
| Buck mode d > 0.5 | III-IV | $L_{r4}$ | $S_{a2}$ | $S_4$ |
|  | II-IV | $L_{r1}$ | $S_{a1}$ | $S_1$ |
| Buck mode d < 0.5 | I-II | $L_{r4}$ | $S_{a2}$ | $S_4$ |
|  | I-III | $L_{r1}$ | $S_{a1}$ | $S_1$ |

As an example, the operation principles for the transition of modes are presented infra.

The circuit waveforms and equivalent operation modes are presented in FIG. 22 and FIGS. 23A-23H.

Figures 23A, 23B:
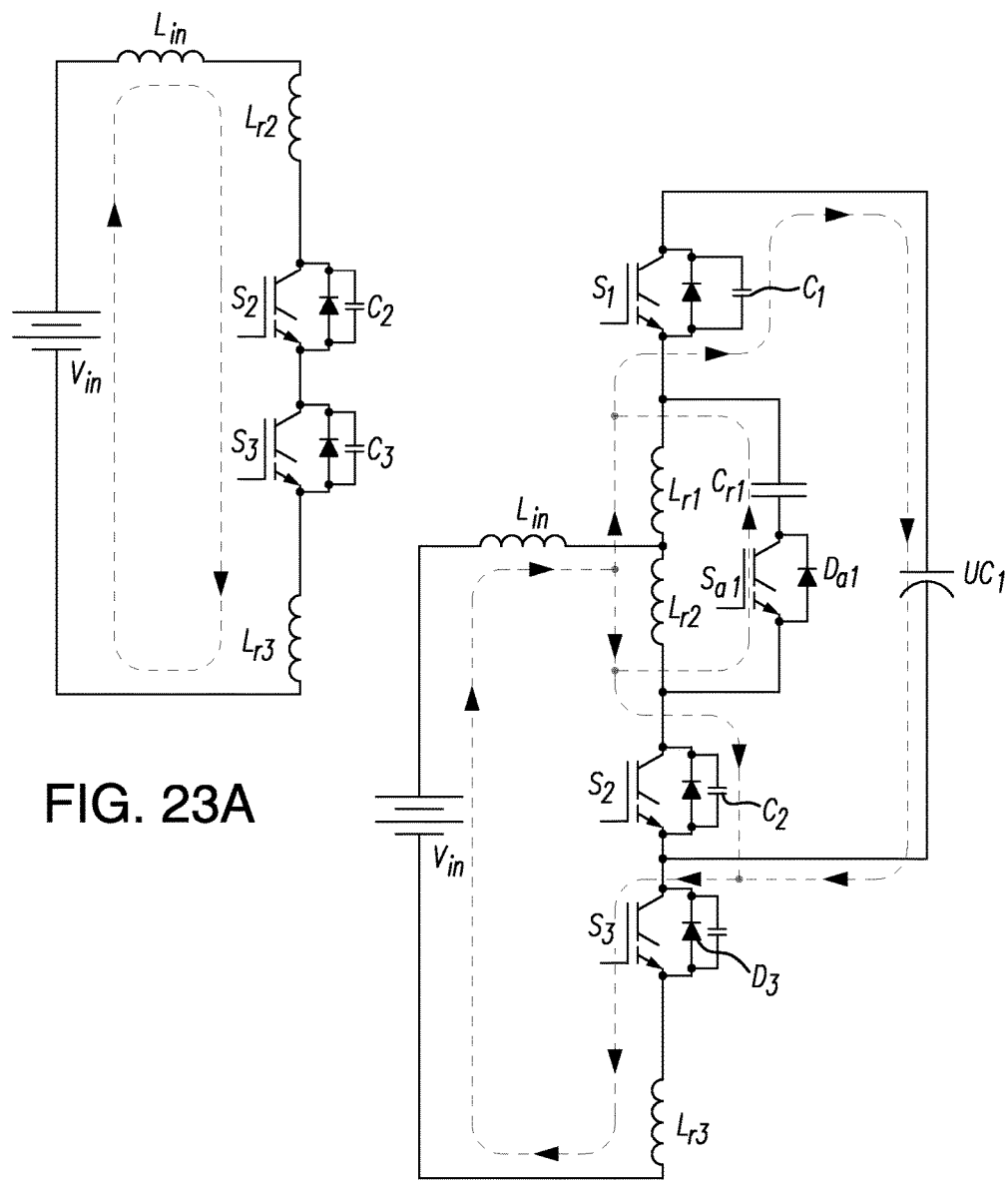
FIGS. 23A, 23B, 23C, 23D, 23E, 23F, 23G, and 23H represent equivalent circuits in operational modes at a number of operation intervals, where FIG. 23A corresponds to the operation intervals $t<t_0$, FIG. 23B corresponds to the operation interval $t_0<t<t_1$, FIG. 23C corresponds to the operational interval between $t_1<t<t_2$, FIG. 23D corresponds to the operational interval $t_2<t<t_3$, FIG. 23E corresponds to the operational interval between $t_3<t<t_4$, FIG. 23F corresponds to the operational interval between $t_4<t<t_5$, FIG. 23G corresponds to the operational interval $t_5<t<t_6$, and FIG. 23H corresponds to the operational interval $t_6<t<t_7$.

Operation Interval 1 [t<t$_0$] Presented in FIG. 23A

Before $t_0$, both $S_2$ and $S_3$ are ON, the transformer 52 ($L_{in}$) stores energy, and the DC/DC converter 24 operates in boost stage I of the TL (three level) converter. In this mode, $i_{Lr1}(t_0)$=0. In this case, the ON time of the auxiliary switch is equal to the quarter of the resonance, $v_{Cr1}(t_0)$=0. This will be explained in further paragraphs. The current of $L_{r2}$ is equal to $$i_{Lr2}(t) = i_{Lr2}(t_7) + \frac{V_{in}}{L_{in} + 2L_r}t \qquad \text{Eq. (15)}$$

This time interval is determined by the effective on-time duty ratio of the main switch $S_2$.

Operation Interval 2 [$t_0$<t<$t_1$] Presented in FIG. 23B

At t=$t_0$, the main switch $S_2$ is turned OFF. The current of $L_{r2}$ begins to resonate in the resonance tank through $L_{r1}$-$L_{r2}$-$C_{r1}$. The sum of the voltages of the inductors $v_{L1}$+$v_{L2}$ is equal to $v_{cr1}$. The parasitic capacitance $C_1$ of the main switch $S_1$, discharges over the output capacitor, and transfers its energy, while the parasitic capacitance $C_2$ of the main switch $S_2$ is charged as $v_{S1}(t_0)$=$V_0$/2, and $v_{S1}$+$v_{Cr1}$+$v_{S2}$>$V_0$/2.

The initial conditions can be noted as $$i_{Lr2}(t_0) = i_{Lr2}(t_7) + \frac{1}{2}\left(\frac{V_{in}}{L_{in} + 2L_r}\right)t_{70} \qquad \text{Eq. (16)}$$

$$i_{Lr1}(t_0)=0 \qquad \text{Eq. (17)}$$

$$v_{Cr1}(t_0)=0 \qquad \text{Eq. (18)}$$

The natural frequency of the resonant tank is expressed as $$\omega = \frac{1}{\sqrt{2L_rC_{r1}}} \qquad \text{Eq. (19)}$$

Figures 23C, 23D:
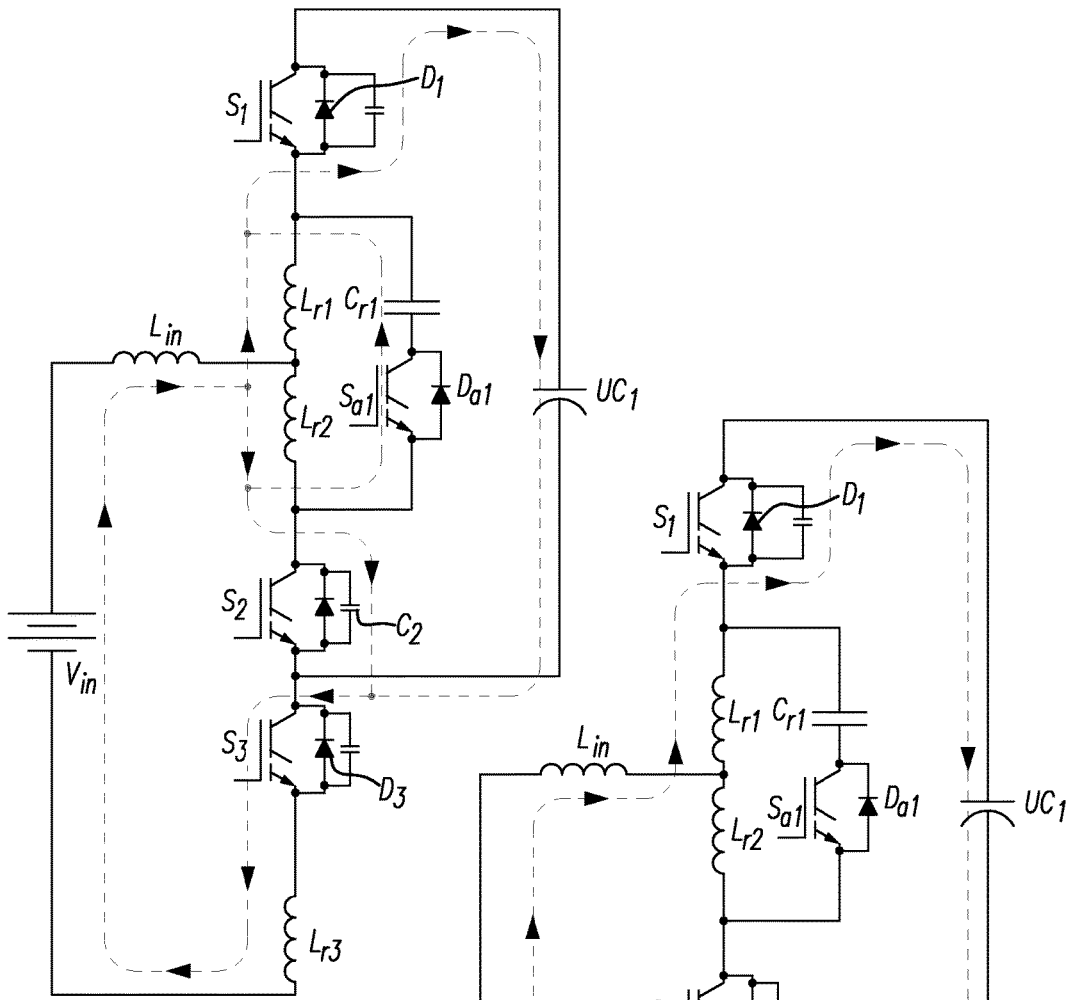

Operation Interval 3 [$t_1$<t<$t_2$] Presented in FIG. 23C

The parasitic capacitance $C_1$ is discharged completely at the end of operation interval 2, as current begins commutating from $L_{r2}$ to $L_{r1}$, and $D_1$ conducts. The parasitic capacitance $C_2$ continues to get charged. This interval occurs very quickly as $C_1$ is typically in the order of several hundreds of pF, and is not included in the calculations for simplicity.

The energy stored in $L_{r2}$ is transferred to the resonant capacitor $C_{r1}$ through the diode $D_{a1}$. For this interval, the resonant inductor currents can be expressed as $$i_{Lr2}(t)=i_{Lr2}(t_0)\cos(\omega t) \qquad \text{Eq. (20)}$$

$$i_{Lr1}(t)=i_{Lr2}(t_0)(1-\cos(\omega t)) \qquad \text{Eq. (21)}$$

The resonant capacitor voltage $V_{Cr1}$ can be written as $$v_{Cr1}(t) = \frac{i_{Lr2}(t_0)}{C_{r1}\omega}\sin(\omega t) \qquad \text{Eq. (22)}$$

At t=$t_2$, $i_{Lr2}$ becomes zero as it transfers all its energy to the resonant capacitor $C_{r1}$.

$$i_{Lr2}(t_2)=0 \qquad \text{Eq. (23)}$$

From this final state condition, $t_{02}$ can be found as $$t_{02} = \frac{\pi}{2\omega} \qquad \text{Eq. (24)}$$

Operation Interval 4 [$t_2$<t<$t_3$] Presented in FIG. 23D

At t=$t_2$, the resonant inductor current $i_{Lr1}$ is the same as $i_{Lr2}(t_0)$. The resonant capacitor voltage $V_{Cr1}$ can be found from the energy transfer between $v_{cr1}$ and $i_{Lr2}$ as $$v_{Cr1}(t_2) = \sqrt{\frac{2L_r}{C_{r1}}i_{Lr2}^2(t_0)} \qquad \text{Eq. (25)}$$

The energy stored in $C_{r1}$ will be used to achieve soft-switching at a latter stage. In this time interval, the converter transits from the mode I to mode III of regular operation modes. The resonant inductor current $i_{Lr1}$ can be written as $$i_{Lr1}(t) = i_{Lr1}(t_2) - \left(\frac{V_o/2 - V_{in}}{L_{in} + L_r}\right)t \qquad \text{Eq. (26)}$$

Figure 23E:
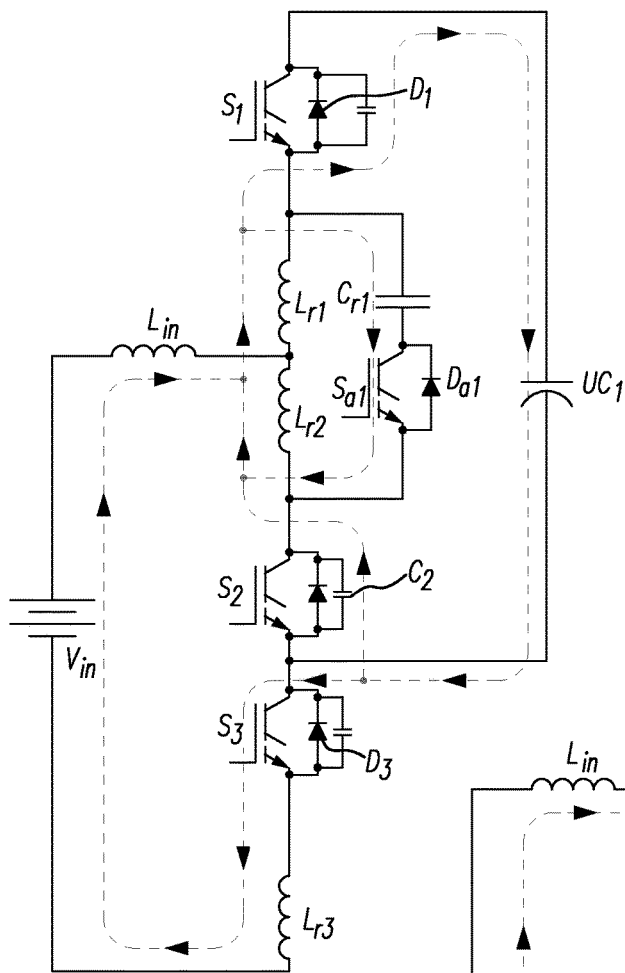

Operation Interval 5 [$t_3$<t<$t_4$] Presented in FIG. 23E

Before the main switch $S_2$ is turned ON, the auxiliary switch, $S_{a1}$, is turned ON to transfer the energy stored in the capacitor to the resonant inductor, $i_{Lr2}$. The auxiliary switch $S_{a1}$ is turned ON under zero-current. $V_{Lr2}$ is half of the $V_{Cr1}$ and $i_{Lr2}$ increases in a sinusoidal shape. The parasitic capacitance $C_2$ is first quickly charged to $V_{Cr1}$+$V_o$/2, then is discharged as $v_{Cr1}$ decreases.

At t=$t_3$, the initial conditions are as follows:

$$i_{Lr2}(t_3)=0, v_{cr1}(t_3)=v_{cr1}(t_2).$$

In this interval, the resonant inductor currents $I_{Lr}$ and capacitor voltage $V_{cr}$ are $$v_{Cr1}(t)=v_{Cr1}(t_3)\cos(\omega t) \qquad \text{Eq. (27)}$$

$$i_{Lr2}(t)=-C_r v_{Cr1}(t_3)\omega \sin(\omega t) \qquad \text{Eq. (28)}$$

$$i_{Lr1}(t)=i_{Lr1}(t_3)+C_r v_{Cr1}(t_3)\omega \sin(\omega t) \qquad \text{Eq. (29)}$$

$$t_{34} = \frac{\pi}{2\omega} \qquad \text{Eq. (30)}$$

At the end of this mode, $V_{Cr1}$ is equal to that of at $t=t_0$, $v_{Cr1}(t_4)=v_{Cr1}(t_0)=0$.

At $t=t_5$, the current of the body diode $D_1$ increases to approximately twice of the load current.

Figure 23F:
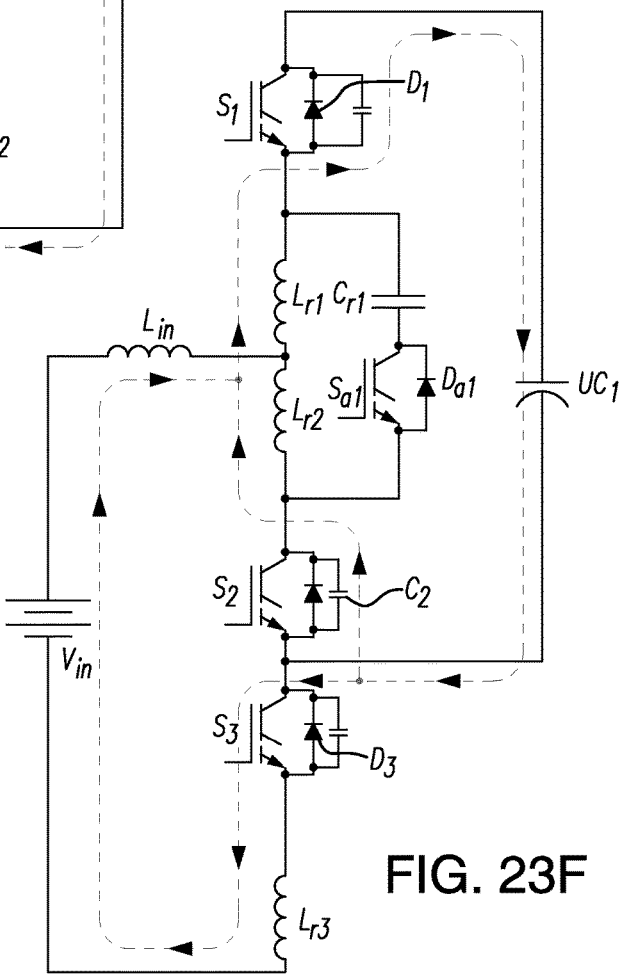

Operation interval 6 [$t_4<t<t_5$] presented in FIG. 23F

When the energy stored in the resonant capacitor $C_{r1}$ is completely transferred via $S_{a1}$, the auxiliary switch $S_{a1}$ is turned OFF under zero voltage. Subsequently, the parasitic capacitance $C_2$ quickly discharges to zero. This time interval can be expressed as $$t_{45} = \frac{2L_r\left(i_{Lr2}(t_4) - \sqrt{i_{Lr2}(t_4)^2 - \frac{C_{oss2}V_o^2}{2L_r}}\right)}{V_o} \quad \text{Eq. (31)}$$

where $C_{oss2}$ corresponds to the capacitance of the parasitic capacitance $C_2$.

Figure 23G:
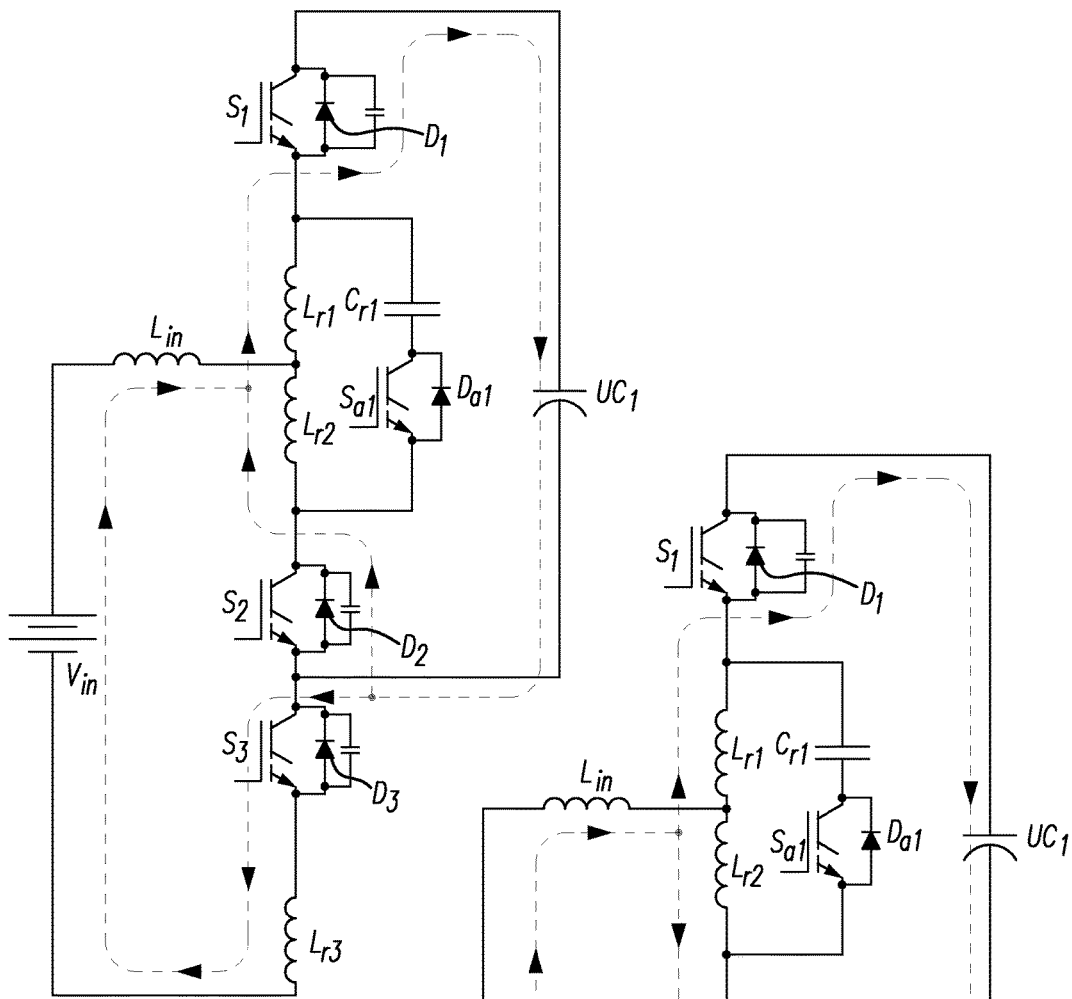

Operation Interval 7 [$t_5<t<t_6$] Presented in FIG. 23G

When $v_{s2}$ reaches −0.7V, the body diode $D_2$ of the main switch $S_2$ conducts. This time period is the ZVS period. The main switch $S_2$ can be turned ON at any time during this interval.

At $t=t_5$, the initial conditions are $$i_{Lr2}(t_5) = -\sqrt{\frac{C_{r1}v_{Cr1}^2(t_2)}{2L_r}} \quad \text{Eq. (32)}$$

$$i_{Lr1}(t_3)=i_{Lr1}(t_4)+C_{r1}v_{Cr1}(t_4)\omega \sin(\omega t_4) \quad \text{Eq. (33)}$$

$v_{Lr2}$ is equal to $V_o/4$, and $i_{Lr2}$ decreases linearly.

$$i_{Lr2}(t) = i_{Lr2}(t_5) + \frac{V_o}{4L_r}t \quad \text{Eq. (34)}$$

$$i_{Lr1}(t) = i_{Lr1}(t_5) - \frac{V_o}{4L_r}t \quad \text{Eq. (35)}$$

At $t=t_6$, the main switch $S_2$ is turned ON, while its body diode $D_2$ is conducting. The zero-voltage-switching can be achieved at this instant. With the assumption of $t_{45} \ll t_{56}$, $t_{46} \cong t_{56}$, the ZVS time interval can be expressed as $$t_{56} = \frac{4L_r(i_{Lr2}(t_6) - i_{Lr2}(t_5))}{V_o} \quad \text{Eq. (36)}$$

Figure 23H:
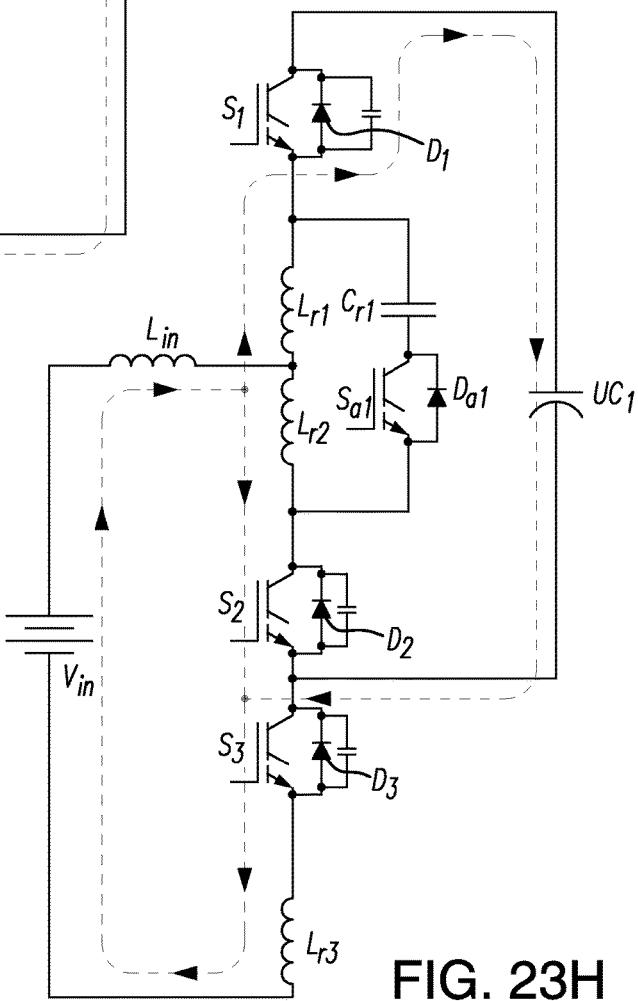

Operation Interval 8 [$t_6<t<t_7$] Presented in FIG. 23H

This interval starts after the main switch $S_2$ is turned ON. First, the current of the body diode $D_2$ of the main switch $S_2$ reaches zero. In this time interval, the main switch $S_2$ begins to conduct current, and input current commutes from $L_{r1}$ to $L_{r2}$.

At $t=t_6$, $i_{Lr1}$ is $$i_{Lr1}(t_6) = i_{Lr1}(t_5) - \frac{V_o}{4L_r}t_{56} \quad \text{Eq. (37)}$$

The resonant inductor currents for this interval can be expressed as $$i_{Lr1}(t) = i_{Lr1}(t_6) - \frac{V_o}{4L_r}t \quad \text{Eq. (38)}$$

$$i_{Lr2}(t) = i_{Lr2}(t_6) + \frac{V_o}{4L_r}t \quad \text{Eq. (39)}$$

At $t=t_7$, the input current commutation from $L_{r1}$ to $L_{r2}$ is completed, and $i_{Lr1}$ becomes zero. This time interval can be expressed as $$t_{67} = \frac{4L_r(i_{Lr2}(t_7) - i_{Lr2}(t_6))}{V_o} \quad \text{Eq. (40)}$$

The topology of the DC-to-DC converter 24 has a number of advantages for high voltage/high power UC hybrid systems:

1. The ZVS circuits 44 and 48 eliminate the turn-ON switch losses of all switches, e.g., main switches $S_1$-$S_4$, at any operation mode. Owing to the halved switching losses, the switching frequency can be increased to 250 kHz without adding significant heat sink to the system. In this case, the doubled system frequency would be 500 kHz.

2. Without the ZVS soft-switching, the DC-to-DC converter frequency may be in the range of up to 300-400 kHz. Accordingly, without soft switching, the switching frequency of the SiC semiconductors (the IGBTs switches) is limited to approximately 150-200 kHz.

The switching losses of the IGBT switches are expressed as $$P_{IGBT\_switch}(E_{ON}+E_{OFF}) \times fs, \quad \text{Eq. (41)}$$

where fs is a switching frequency, and $E_{ON}$ and $E_{OFF}$ are the switching losses during the switching ON and switching OFF, respectively.

It is clear that the switching losses are a function of the switching frequency. The effective frequency in the present system is twice of the switching frequency of the power switches. Therefore, the transfer inductor size (which is the biggest component compared to the semiconductor devices) can be reduced due to the doubled system frequency.

In addition, the current ripple of the transfer inductor 24, is significantly smaller than that in conventional topologies. Preliminary analysis shows that the size of the inductor may be reduced four times in comparison to two level boost converter when the same current ripple is targeted and same system frequency is adopted.

3. The voltage ratings of the switches are half of a two-level converter. The lower voltage rated switches are typically faster and have lower internal resistance, which contribute to the higher efficiency. Similarly, the anti-parallel diodes of the switches will be faster and the reverse recovery losses would be lower.

4. As a part of the converter operation, two split DC link capacitors UC1 and UC2 may be used. In the proposed configuration, the UC is located at the high voltage side and can be split into two UC banks to replace the DC link capacitors. Thereby, the DC link capacitors may be eliminated on the UC side.

Although this invention has been described in connection with specific forms and embodiments thereof, it will be appreciated that various modifications other than those discussed above may be resorted to without departing from the spirit or scope of the invention as defined in the appended claims. For example, functionally equivalent elements may be substituted for those specifically shown and described, certain features may be used independently of other features, and in certain cases, particular locations of the elements may be reversed or interposed, all without departing from the spirit or scope of the invention as defined in the appended claims.

What is claimed is:

1. A powertrain system in plug-in electric vehicles (PEVs), comprising:
at least one Energy Storage Sub-System (ESS) having opposite first and second terminals,
a plurality of Propulsion Machine-Inverter Groups, each composed of a Propulsion Machine and a Propulsion Inverter coupled to an input of said Propulsion Machine, said plurality of Propulsion Machine-Inverter Groups being operatively coupled to said at least one ESS for being powered in accordance with power requirements of said Propulsion Machines,
at least one common Direct Current (DC) Link operatively coupled between said at least one ESS and at least one of said plurality of Propulsion Machine-Inverter Groups, and
at least one power converter operatively coupled between said at least one ESS and said common DC link, wherein said power converter includes:
main switches $S_1$, $S_2$, $S_3$, and $S_4$ coupled sequentially between said opposite first and second terminals of said at least one ESS, wherein said main switches $S_2$ and $S_3$ are coupled each to the other,
a first zero-voltage switching (ZVS) circuit coupled to said first terminal of said at least ESS between said main switches $S_1$ and $S_2$, said first ZVS circuit being configured to substantially eliminate switching losses in main switches $S_1$ and $S_2$, thereby attaining an increased switching frequency for said main switches $S_1$ and $S_2$, and
a second zero-voltage switching (ZVS) circuit coupled to said second terminal of said at least one ESS between said main switches $S_3$ and $S_4$, said second ZVS circuit being configured to substantially eliminate switching losses in said main switches $S_3$ and $S_4$, thereby attaining an increased switching frequency for said main switches $S_3$ and $S_4$,
wherein each of said main switches $S_1$-$S_4$ includes a solid state switch.

2. The powertrain system of claim 1, further comprising a Maximum Efficiency Tracker Sub-System operatively coupled to the Propulsion Machine in at least one of said plurality of Propulsion Machine-Inverter Groups to dynamically track operational power requirements of said Propulsion Machine, and an Inverter Controller Sub-System operatively coupled to said Maximum Efficiency Tracker Sub-System and said Propulsion Inverter in said at least one Propulsion Machine-Inverter Group, wherein said Inverter Controller Sub-system is configured to control said Propulsion Inverter to split power outputted from said at least one ESS in correspondence with said Propulsion Machine operational power requirements.

3. The powertrain system of claim 1, wherein said at least one power converter operates to dynamically adjust the power level outputted by said at least one ESS to said common DC Link's voltage variations.

4. The powertrain system of claim 3, further comprising a plurality of ESSs composed of a first group of ESSs and a second group of ESSs, and a plurality of said power converters operatively coupled between said second group of ESSs and said common DC Link, wherein at least one ESS in said first group thereof is directly coupled to said common DC Link, and wherein each ESS of said second group of ESSs is coupled to said common DC Link through a respective one of said plurality of power converters.

5. The powertrain system of claim 4, further comprising a plurality of power converter's controllers, each controller being operatively coupled to a respective one of said plurality of power converters, and a Supervisory Energy Management Sub-System coupled to said power converters' controllers and said Maximum Efficiency Tracker Sub-System, wherein said Supervisory Energy Management Sub-System is configured to supply required power signals to said power converters' controllers responsive to the readings of the Maximum Efficiency Tracker Sub-System, thereby affecting the splitting of power among said plurality of ESS as required by the operational power requirements of said plurality of Propulsion Machines.

6. The powertrain system of claim 3, wherein said power converter is selected from a group consisting of: DC-to-DC converter, AC-to-DC converter, and DC-to-AC converter.

7. The powertrain system of claim 3, further comprising a plurality of ESSs, and a plurality of power converters, wherein each ESS of said plurality thereof is operatively coupled to said common DC Link through a respective one of said plurality of said power converters.

8. The powertrain system of claim 3, wherein said power converter is a single input-single output converter.

9. The powertrain system of claim 3, wherein said power converter is a multi-input-single output converter, further comprising a plurality of ESSs composed of a first group of ESSs and a second group of ESSs, wherein said ESSs in said second group thereof are coupled to said common DC Link through said multi input-single output converter.

10. The powertrain system of claim 9, further comprising a second group of power converters, wherein each power converter in said second group thereof is coupled between respective two of said plurality of ESSs.

11. The powertrain system of claim 9, wherein at least one ESS in said first group of the ESSs is directly coupled to said common DC Link.

12. The powertrain system of claim 11, further comprising a second group of power converters, wherein each power converter in said second group thereof is coupled between respective two of said plurality of ESSs.

13. The powertrain system of claim 1, further comprising a multi input-multi output power converter, a plurality of ESSs, and a plurality of said DC Links, wherein each Propulsion Machine-Inverter Group in said plurality thereof is coupled to a respective one of a plurality of outputs of said multi input-multi output power converter through a respective one of said plurality of DC links, and wherein each of said plurality of ESSs is coupled to a respective input of said multi input-multi output power converter.

14. The powertrain system of claim 13, further comprising a second group of power converters, wherein each power converter in said second group thereof is coupled between respective two of said plurality of ESSs.

15. The powertrain system of claim 14, wherein said plurality of ESSs further comprises a second group of ESSs, wherein each ESS in said second group thereof is connected to a respective Propulsion Machine-inverter Group through a respective one of said plurality of DC Links, and wherein said each power converter in said second group thereof is coupled between respective two of said ESSs in said second group thereof.

16. The powertrain system of claim 1, further comprising a plurality of ESSs, a plurality of said DC Links, and a plurality of power converters, wherein each power converter in said plurality thereof is coupled to a respective one of said plurality of ESSs, and wherein each of said plurality of Propulsion Machine-Inverter Groups is coupled to a respective one of said plurality of power converters through a corresponding one of said plurality of DC Links.

17. The powertrain system of claim 16, further comprising a second group of power converters, wherein each power converters in said second group thereof is coupled between respective two of said plurality of ESSs.

18. The powertrain system of claim 1, further comprising a plurality of ESSs composed of a first group of ESSs and a second group of ESSs, a plurality of said DC Links, and a plurality of single input-single output power converters,
  wherein at least one ESS in said first group of ESSs is coupled to a respective Propulsion Machine-Inverter Group through a respective one of said plurality of DC Links,
  wherein each ESSs in said second group thereof is coupled to a respective Propulsion Machine-Inverter Group through a corresponding single input-single output power converter, and
  wherein each of said plurality of single input-single output power converters is coupled between a respective ESS in said second group thereof and a corresponding one of DC Links of said plurality thereof.

19. The powertrain system of claim 1, further comprising a plurality of ESSs, and a plurality of DC Links, wherein each of said plurality of ESSs is coupled to a respective Propulsion Machine-Inverter Group via a respective DC Link of said plurality thereof.

20. The powertrain system of claim 19, further comprising a plurality of power converters, wherein each of said plurality of power converters is coupled between respective two of said plurality of ESSs.

21. The powertrain system of claim 18, further comprising a second group of power converters, wherein each of said power converters in the second group thereof is coupled between respective two of said plurality of ESSs.

22. A powertrain system in plug-in electric vehicles (PEVs), comprising:
  at least one Energy Storage Sub-System (ESS),
  a plurality of Propulsion Machine-Inverter Groups, each built with a Propulsion Machine and a Propulsion Inverter coupled to an input of said Propulsion Machine, said plurality of Propulsion Machine-Inverter Groups being operatively coupled to said at least one ESS for being powered in accordance with power requirements of said Propulsion Machines,
  at least one common Direct Current (DC) Link operatively coupled between said at least one ESS and at least one of said plurality of Propulsion Machine-Inverter Groups, and
  at least one DC-to-DC power converter operatively coupled between said at least one ESS and said common DC Link, wherein said at least one DC-to-DC power converter includes:
  main switches $S_1$, $S_2$, $S_3$, and $S_4$ coupled sequentially between opposite first and second terminals of said at least one ESS, wherein said main switches $S_2$ and $S_3$ are coupled each to the other, a first zero-voltage switching (ZVS) circuit coupled to said first terminal of said at least one ESS between said main switches $S_1$ and $S_2$ and functioning to substantially eliminate switching losses in main switches $S_1$ and $S_2$, thereby attaining an increased switching frequency for said main switches $S_1$ and $S_2$,
  a second zero-voltage-switching (ZVS) circuit coupled to said second terminal of said at least one ESS between said main switches $S_3$ and $S_4$, and functioning to substantially eliminate switching losses in main switches $S_3$ and $S_4$, thereby attaining an increased switching frequency for said main switches $S_3$ and $S_4$, wherein each said main switches $S_1$-$S_4$ includes a solid state switch and a diode coupled in anti-parallel connection to said solid state switch,
  a transfer inductor coupled between said first terminal of at least one ESS and said first ZVS circuit,
  an ultracapacitor bank split in two bank capacitors $UC_1$ and $UC_2$ functioning as the DC links capacitors, wherein said bank capacitor $UC_1$ is connected between said main switch $S_1$ and a connection node of said main switches $S_2$ and $S_3$, and wherein said bank capacitor $UC_2$ is connected between said main switch $S_4$ and said connection node of said main switches $S_2$ and $S_3$, and
  a controller supplying control signals $V_{tri1}$ to said main switches $S_1$ and $S_2$, and $V_{tri2}$ to said main switches $S_3$ and $S_4$ to control switching of respective ones of said main switches $S_1$-$S_4$ in a predetermined order depending on a required mode of operation to attain efficient three levels DC-to-DC voltage conversion with decreased switching losses and reduced current ripple on said transfer inductor.

23. The powertrain system of claim 22, wherein said DC-to-DC converter operates bi-directionally in a mode of operation selected from a group including:
  (a) a boost mode, where the power flow is directed from said at least one ESS to the DC Link, and
  (b) a buck mode, where the energy flow is directed form the DC Link to said at least one ESS,
  wherein in said boost mode of operation, said main switches $S_2$ and $S_3$ are switch ON, and said main switches $S_1$ and $S_4$ are switched OFF,
  wherein in said buck mode of operation, said main switches $S_1$ and $S_4$ are pulse-width modulated, and said main switches $S_2$ and $S_3$ are switched OFF, and
  wherein said control signals $V_{tri1}$ and $V_{tri2}$ have 180° phase shift with respect each to the other.

24. The powertrain system of claim 22, wherein a switching frequency of a corresponding one of said main switches $S_1$, $S_2$, $S_3$, and $S_4$ is controlled in accordance with a period of a respective one of said control signals $V_{tri1}$ and $V_{tri2}$,
  wherein said corresponding main signal is turned ON when a value of a duty cycle of said corresponding main switch exceeds an amplitude of said respective control signal, and
  wherein the turn-on time of said corresponding main switch is phase-shifted, resulting in an effective frequency of said DC-to-DC converter twice as high as said switching frequency.

* * * * *